US012323528B2

(12) United States Patent
Akhter et al.

(10) Patent No.: US 12,323,528 B2
(45) Date of Patent: *Jun. 3, 2025

(54) PROXY-BASED IDENTITY AND ACCESS MANAGEMENT FOR WEB APPLICATIONS

(71) Applicant: Microsoft Technology Licensing, LLC, Redmond, WA (US)

(72) Inventors: Saeed Javed Akhter, Redmond, WA (US); Steven Soneff, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,482

(22) Filed: Nov. 15, 2023

(65) Prior Publication Data
US 2024/0089107 A1    Mar. 14, 2024

Related U.S. Application Data

(63) Continuation of application No. 17/388,807, filed on Jul. 29, 2021, now Pat. No. 11,856,102.

(51) Int. Cl.
*H04L 9/32* (2006.01)
*H04L 9/08* (2006.01)
*H04L 9/40* (2022.01)
*H04L 67/02* (2022.01)

(52) U.S. Cl.
CPC .......... *H04L 9/3213* (2013.01); *H04L 9/0891* (2013.01); *H04L 63/08* (2013.01); *H04L 63/10* (2013.01); *H04L 67/02* (2013.01)

(58) Field of Classification Search
CPC ......... H04L 63/08; H04L 63/10; H04L 67/02; H04L 9/3213
See application file for complete search history.

(56) References Cited

U.S. PATENT DOCUMENTS

2010/0251340 A1* 9/2010 Martin .................... G06F 9/541
726/4
2014/0282903 A1* 9/2014 Singh ..................... H04L 65/70
726/4
2020/0125700 A1* 4/2020 Chang ................ G06F 21/6218

* cited by examiner

*Primary Examiner* — Esther B. Henderson
(74) *Attorney, Agent, or Firm* — Weaver IP L.L.C.

(57) ABSTRACT

Techniques described herein are directed to proxies configured to handle identity and access management for a web application. For instance, a first proxy receives requests to the application from a browser. The first proxy redirects the browser to an identity endpoint, which prompts the user to enter authentication credentials for the application. Upon successful authentication, the endpoint provides an access token for accessing web APIs to the first proxy. The first proxy provides the token to a second proxy, which stores the token. The second proxy receives anonymous API calls from the web application to the web APIs. When receiving an anonymous API call, the second proxy obtains the token and inserts it into an outgoing request to the API. Responsive to the API returning a message indicating that the token is invalid, the second proxy communicates with the first proxy to obtain a new token from the endpoint.

20 Claims, 11 Drawing Sheets

PROXY-BASED IDENTITY AND ACCESS MANAGEMENT FOR WEB APPLICATIONS

CROSS-REFERENCE TO RELATED APPLICATION(S)

The instant application is a Continuation of, and claims priority to, U.S. patent application Ser. No. 17/388,807, entitled "PROXY-BASED IDENTITY AND ACCESS MANAGEMENT FOR WEB APPLICATIONS," and filed on Jul. 29, 2021, the entirety of which is incorporated by reference herein.

BACKGROUND

Web application security is the process of protecting websites and online services against different security threats that exploit vulnerabilities in an application's code. Common targets for web application attacks are content management, database administration tools, and software as a service (SaaS) applications. Malicious entities consider web applications high-priority targets due to (1) the inherent complexity of their source code, which increases the likelihood of unattended vulnerabilities and malicious code manipulation; and (2) high value rewards, including sensitive private data collected from source code manipulation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to network proxies that are configured to handle identity and access management for a web application. For instance, an incoming network proxy is configured to receive requests to a web application from a browser application. The incoming network proxy is configured to redirect the browser application to an identity endpoint, which prompts the user to enter authentication credentials for the web application. Upon successful authentication, the identity endpoint provides an access token utilized to access web application programming interfaces (APIs) to the incoming network proxy. The incoming network proxy provides the access token to an outgoing network proxy, which stores the access token. The outgoing network proxy is configured to receive anonymous API calls from the web application to the web APIs. When receiving an anonymous API call to a web API, the outgoing network proxy obtains the access token and inserts it into an outgoing request to the web API. In the event that the web API returns a message indicating that the access token is invalid or is not associated with the proper permissions to access certain data from the web API, the outgoing network proxy communicates with the incoming network proxy to obtain a new access token from the identity endpoint.

Further features and advantages of the disclosed embodiments, as well as the structure and operation of various embodiments, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
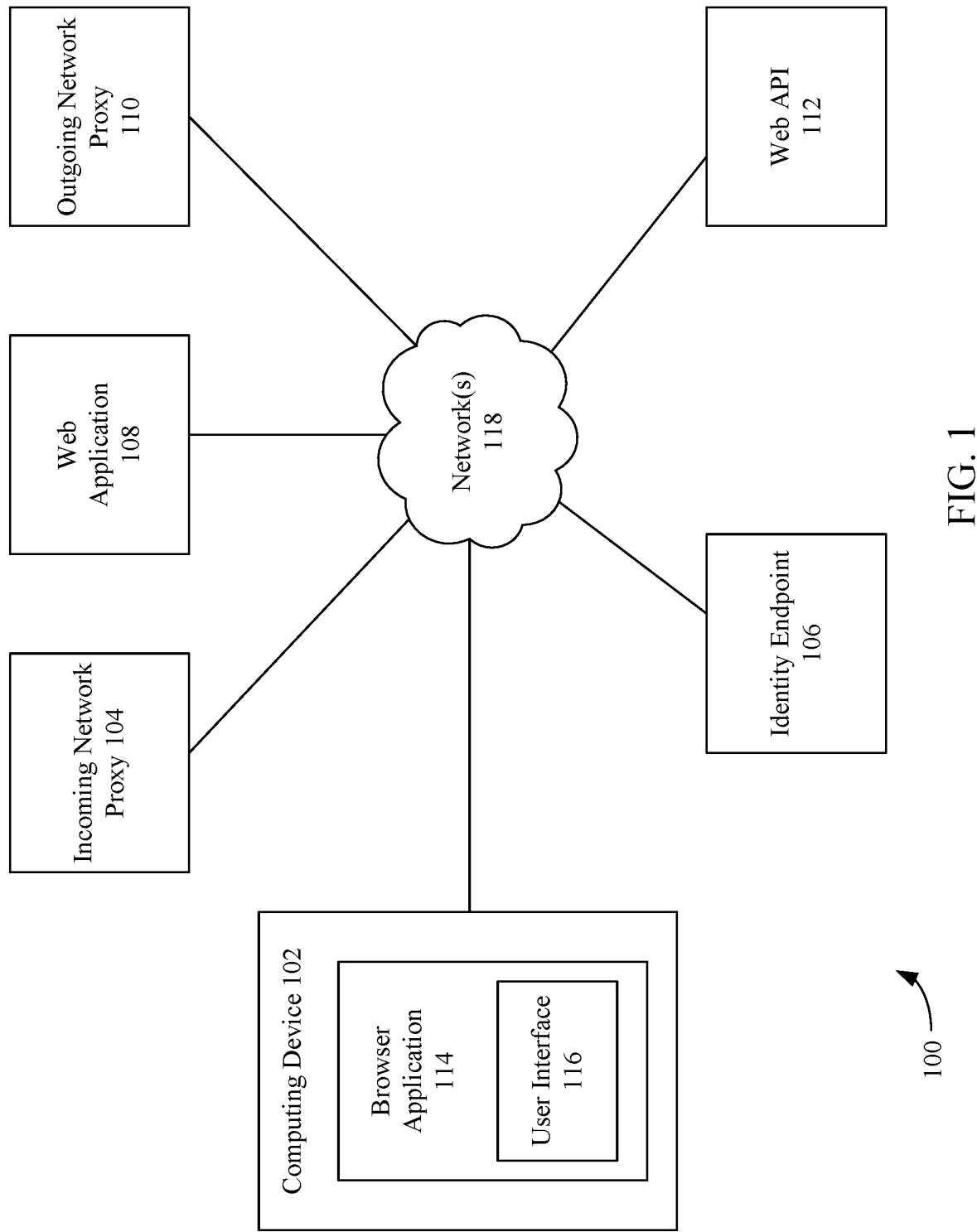
FIG. 1 is a block diagram of a system configured to handle identity and access management for a web application in accordance with an example embodiment.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

The embodiments disclosed herein are directed to network proxies that are configured to handle identity and access management for a web application. For instance, an incoming network proxy is configured to receive requests to a web application from a browser application. The incoming network proxy is configured to redirect the browser application to an identity endpoint, which prompts the user to enter authentication credentials for the web application. Upon successful authentication, the identity endpoint provides an access token utilized to access web APIs to the incoming network proxy. The incoming network proxy provides the access token to an outgoing network proxy, which stores the access token. The outgoing network proxy is configured to receive anonymous API calls from the web application to the web APIs. When receiving an anonymous API call to a web API, the outgoing network proxy obtains the access token and inserts it into an outgoing request to the web API. In the event that the web API returns a message indicating that the access token is invalid or is not associated with the proper permissions to access certain data from the web API, the outgoing network proxy communicates with the incoming network proxy to obtain a new access token from the identity endpoint.

The foregoing techniques advantageously simplify the development and code of the web application, as the web application is no longer required to implement complex authentication libraries and complex integration steps to maintain security artifacts (e.g., access tokens) and include security artifacts in API calls to web APIs. Instead, the web application can simply issue anonymous API calls to web APIs, and the outgoing network proxy handles all the complexity of retrieving the correct access token and inserting the access token into outgoing requests to the web APIs. Such techniques also enable advanced security and access management capabilities, including, but not limited to continuous access evaluation, token binding, token renewal, and distributed token caching.

Moreover, because the code of the web application is less complex, the chance of introducing bugs and exploitable vulnerabilities in the code is reduced. Furthermore, in the event that a malicious entity manages to hack the web application, security artifacts will not be compromised, as they are maintained by the outgoing network proxy, and not the web application. As such, security safeguards for protecting security artifacts do not need to be implemented within the web application. This advantageously improves the functioning of the computing device on which the web application executes, as compute resources (such as processor cycles, power, memory) normally utilized to implement the security safeguards are conserved.

Embodiments may be implemented in a variety of systems. For instance, FIG. 1 is a block diagram of a system 100 configured to handle identity and access management for a web application in accordance with an example embodiment. As shown in FIG. 1, system 100 comprises a computing device 102, an incoming network proxy 104, an identity endpoint 106, a web application 108, an outgoing network proxy 110, and a web application programming interface (API). System 100 is described in detail as follows. Computing device 102, incoming network proxy 104, identity endpoint 106, web application 108, outgoing network proxy 110, and/or web API 112 may be communicatively coupled via one or more networks 118. Examples of network (s) 118 include, but are not limited to, include, local area networks (LANs), wide area networks (WANs), enterprise networks, the Internet, etc., and may include one or more of wired and/or wireless portions. Each of incoming network proxy 104 and outgoing network proxy 110 may be implemented via a respective physical computing device, a virtual machine executing on a respective physical computing device, and/or any type of device comprising one or more processors and/or memories that is configured to process data. Alternatively, each of incoming network proxy 104 and outgoing network proxy 110 may be implemented as a software application that executes on the same physical computing device or via a respective virtual machine executing on the same physical computing device.

Computing device 102 is configured to execute a browser application 114. Browser application 114 (i.e., a web browser) is configured to access web pages and/or web applications (e.g., web application 108) and retrieve and/or present content located thereon and/or thereof via a user interface 116 of browser application 114. Examples of browser application 114 include Microsoft Edge®, published by Microsoft Corp. of Redmond, Washington, Mozilla Firefox®, published by Mozilla Corp. of Mountain View, California, Safari®, published by Apple Inc. of Cupertino, California, and Google® Chrome, published by Google Inc. of Mountain View, California. Examples of computing device 102 include, but are not limited to, any type of mobile computing device, such as a Microsoft® Surface® device, a personal digital assistant (PDA), a laptop computer, a notebook computer, a tablet computer such as an Apple iPad™, a netbook, a smart phone (such as an Apple iPhone, a phone implementing the Google® Android™ operating system, etc.), a wearable computing device (e.g., a head-mounted device including smart glasses such as Google® Glass™, a virtual headset such as Oculus Rift® by Oculus VR, LLC or HoloLens® by Microsoft Corporation, etc.), or a stationary computing device such as a desktop computer or PC (personal computer), or other browser-enabled device.

Web application 108 is application software that executes on a web server configured to accept requests via a network protocol (e.g., a hypertext transfer protocol (HTTP)), rather than being executed locally on computing device 102. Web application 108 is accessible by a user via browser application 114. Web application 108 may be programmed using a client-server modeled structure, where the user (or "client") is provided services through the web server, which is hosted by a third-party. Web application 108 may be configured to retrieve resources that are requested by a user from web API 112. Examples of resources, include, but are not limited to, documents, e-mails, task information, time and/or date information, weather-related information, and/or any other types of information or data. Examples of web applications 108 include, but are not limited to, web-mail applications, online banking applications, a suite of productivity applications provided as a software-as-a-service (SaaS), etc. Examples of productivity applications include, but are not limited to, a word processing application (e.g., Microsoft Word® published by Microsoft® Corp.), a spreadsheet application (e.g., Microsoft Excel® published by Microsoft® Corp.), a presentation application (e.g., Microsoft PowerPoint® published by Microsoft® Corp.), etc. An example of a productivity suite that is offered as a SaaS includes, but is not limited to, Microsoft® Office 365™ published by Microsoft® Corp.). An example of web API 112 includes, but is not limited to, the Microsoft® Graph API published by Microsoft® Corp.

A user may be required to be authenticated before using web application 108. The authentication may be handled by an authentication service, such as identity endpoint 106. Incoming network proxy 104 may be configured to automatically initiate authentication on incoming requests for web application 108 from browser application 114. For instance, incoming network proxy 104 may automatically cause browser application 114 to redirect to identity endpoint 106. Identity endpoint 106 prompts the user to enter authorization credentials. Identity endpoint 106 validates the authorization credentials and, in response to a successful validation, generates and provides an access token associated with the user to incoming network proxy 104. For instance, the access token may comprise a user identifier (ID) of the user that is associated with the access token. Incoming network proxy 104 provides the access token to outgoing network proxy 110. An example of identity endpoint 106 includes, but is not limited to, the Microsoft® Identity Platform published by Microsoft® Corp.

Outgoing network proxy 110 maintains the access token into a data structure maintained thereby. The data structure stores access tokens for a plurality of different users that have been authenticated by identity endpoint 106. Outgoing network proxy 110 enables API calls from browser application 114 and/or incoming network proxy 104 to web API 112 to be anonymous (i.e., such API calls do not include any security artifacts, such as authentication credentials, access tokens, shared keys, etc.). It is noted that outgoing network proxy 110 may also be utilized in conjunction with legacy applications that do not support modern security and access management features. For example, a line of business applications, such as a Point of Sales application, may be deployed on mobile/desktop devices (e.g., computing device 102) in an organization. Without modifying the Point of Sales application, its security can be modernized. For instance, outgoing network proxy 110 may be installed on such mobile/desktop devices. By installing an outgoing network proxy 110 on such devices, network traffic from both a browser (e.g., browser application 114) and a line of business applications may be received, and advanced security and access management capabilities may be enforced in accordance with the embodiments described herein.

In response to receiving an API call to web API 112, outgoing network proxy 110 obtains the correct access token and generates a request including the access token. In accordance with an embodiment, outgoing network proxy 110 sends the request to web API 112, and web API 112 returns the requested data to outgoing network proxy 110, which provides the data to web application 108. In accordance with another embodiment, outgoing network proxy 110 may provide a callback uniform resource identifier (URI) (e.g., a uniform resource locator (URL)) that web API 112 utilizes to callback web application 108 with the requested data, thereby enabling web API 112 to directly return the requested data to web application 108. Web application 108 provides the requested data to browser application 114 and/or renders the requested data via user interface 116.

Accordingly, outgoing network proxy 110 handles all the complexity of retrieving the correct access token and generating the proper request instead of web application 108. As will be described below, this enables advanced security and access management capabilities. Moreover, the techniques described herein simplify web application 108, as web application 108 simply needs to issue anonymous API calls to web API 112. Moreover, outgoing network proxy 110 may be further configured to handle legacy authentication methods utilized by web application 108, such as, but not limited to, shared key authentication, security assertion markup language (SAML) authentication, basic access authentication, open authorization (OAuth), etc. For instance, outgoing network proxy 110 may be configured to translate legacy authentication methods so that they can be utilized with the advanced, security and access management described herein without having to modify web application 108.

Figure 2:
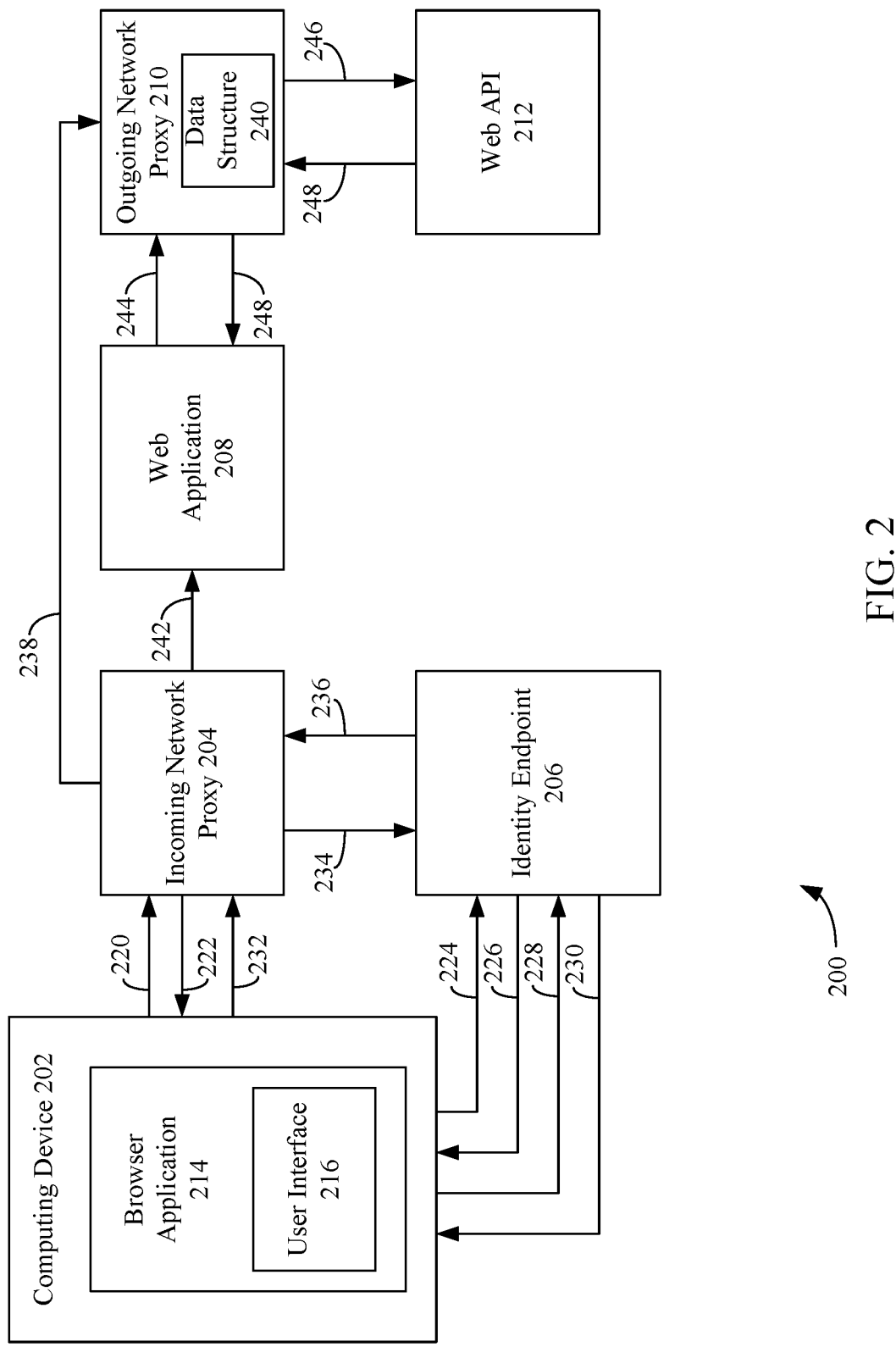
FIG. 2 is a block diagram of a system configured to handle identity and access management for a web application in accordance with another example embodiment.

For instance, FIG. 2 is a block diagram of a system 200 configured to handle identity and access management for a web application in accordance with another example embodiment. As shown in FIG. 2, system 200 comprises a computing device 202, an incoming network proxy 204, an identity endpoint 206, a web application 208, an outgoing network proxy 210, and a web API 212. Computing device 202, incoming network proxy 204, identity endpoint 206, web application 208, outgoing network proxy 210, and web API 212 are examples of computing device 102, incoming network proxy 104, identity endpoint 106, web application 108, outgoing network proxy 110, and web API 112, as respectively described above with reference to FIG. 1. Computing device 202, incoming network proxy 204, identity endpoint 206, web application 208, outgoing network proxy 210, and/or web API 212 may be communicatively coupled via network(s) (e.g., network(s) 118, as described above with reference to FIG. 1).

Each of computing device 202, incoming network proxy 204, identity endpoint 206, web application 208, outgoing network proxy 210, and web API 212 may be configured to implement a request-response protocol in which request messages for particular web pages, applications and/or services are transmitted thereby and messages responsive to the request messages are received. In accordance with an embodiment, computing device 202, incoming network proxy 204, identity endpoint 206, web application 208, outgoing network proxy 210, and web API 212 are configured to transmit hypertext transfer protocol (HTTP) requests and receive HTTP responses.

Computing device 202 is configured to execute a browser application 214, which is an example of browser application 114, as described above with reference to FIG. 1. To access web application 208, browser application 214 may send a request 220. Request 220 may be an HTTP request that specifies a uniform resource identifier (URI) of incoming network proxy 204. Request 220 is provided to incoming network proxy 204. Incoming network proxy 204 provides a response 222 that causes browser application 114 to redirect a web page of identity endpoint 206. For instance, response 222 may be a redirect message (e.g., a HTTP response having a status code in the range 300-399). Response 222 may further specify a URI to which browser application 214 is to be redirected. Such a URI may be referred to as a redirect URI. For instance, the redirect message may specify a URI of a web page of identity endpoint 206.

Responsive to receiving response 222, browser application 214 provides a request 224 (e.g., an HTTP GET request) to identity endpoint 206. Identity endpoint 206 provides a response 226 comprising data (e.g., hypertext markup language (HTML)) that browser application 214 utilizes to render the web page of identity endpoint 206 via user interface 216. The web page to which browser application 214 is redirected prompts the user to enter authentication (e.g., sign-in) credentials for web application 208 via user interface 216. Examples of authentication credentials include, but are not limited to, a username, a password, a personal identification number (PIN), biometric information, a passphrase, etc. The user enters the authentication credentials, and browser application 214 provides a request 228 comprising the authentication credentials to identity endpoint 206. For example, request 228 may be an HTTP POST request. Identity endpoint 206 receives request 228 and verifies whether the authentication credentials provided by the user are valid. In response to determining that the authentication credentials are valid, identity endpoint 206 provides a response 230 to browser application 214. Response 230 may be a redirect message that includes a secret code (e.g., a string of alphanumeric characters) that is specific to the user and may further specify a redirect URI that identifies incoming network proxy 204 or instructs browser application 214 to resume its session with incoming network proxy 204.

Responsive to receiving response 230, browser application 214 redirects to incoming network proxy 204. For instance, browser application 214 provides a request 232 (e.g., an HTTP GET response) for data to incoming network proxy 232. Request 232 may specify the data being requested and also includes the secret code. Incoming network proxy 204 provides a request 234 comprising the secret code to identity endpoint 206. In response, identity endpoint 206 verifies whether the secret code received from incoming network proxy 204 via request 234 is the same as the secret code that it provided to browser application 214 via response 230. In response to determining that the secret codes match, identity endpoint 206 provides a response 236 that includes an access token and/or a refresh token back to incoming network proxy 204. The access token is utilized by web API 212 to determine whether the user is authorized to access the data requested by the user. The access token may expire after a predetermined period of time (e.g., 1-24 hours). In accordance with an embodiment, the access token is a JSON Web Token (JWT)-based access token. The refresh token is utilized to obtain a new access token, for example, in the event that the access token has expired. The refresh token may expire after a predetermined period of time that is greater than the life of the access token (e.g., 1 week, several weeks, 1 month, etc.). New access tokens may be obtained without additional authentication as long as the refresh token has not expired.

Incoming network proxy 204 provides a message 238 to outgoing network proxy 210, which includes the access token and/or refresh token. Outgoing network proxy 210 may comprise a data structure 240 (e.g., a table). Data structure 240 is configured to store access and/or refresh tokens associated with different users. For instance, upon receiving message 238, outgoing network proxy 210 stores the access and/or refresh tokens received via message 238 in data structure 240. Data structure 240 may map each access token and its associated refresh token to the user identified by the access token. Data structure 240 may be populated with access tokens and/or refresh token over time, as outgoing network proxy 210 receives respective messages 238 (each associated with a respective user) from incoming network proxy 204. Data structure 240 may store in any type of physical memory and/or storage device that is described herein, and/or as would be understood by a person of skill in the relevant art(s) having the benefit of this disclosure.

Incoming network proxy 204 may then generate a request 242 based on request 232. Request 242 may specify the data requested by browser application 214 and may include an identifier of the user that initiated the request. Incoming network proxy 204 provides request 242 to web application 208. Web application 208 may then issue an API call 244 to web API 212 for the requested data. However, API call 244 is anonymous in that it does not contain any security artifacts (e.g., the access token) associated with the user that initiated the request. Instead, API call 244 may only include an identifier of the user. Anonymous API call 244 is sent to outgoing network proxy 210.

Outgoing network proxy 210 generates an outgoing request 246 (e.g., an HTTP GET request) to web API 212 based on API call 244. Request 246 includes the access token associated with the user identified by API call 244. Outgoing network proxy 210 utilizes data structure 240 to determine which access token to include in request 246. For instance, outgoing network proxy 210 may provide the user identifier included in API call 244 as an input to data structure 240, and data structure 240 may return the access token associated with the user identifier. Outgoing network proxy 210 may include the access token in the header of request 246.

Web API 212 verifies whether request 246 includes the access token and determines whether the access token is valid. If web API 212 determines that the access token is valid, web API 212 returns a response 248 comprising the requested data to outgoing network proxy 210, which provides response 248 to web application 208. Web application 208 may provide the requested data to browser application 214 and/or renders the requested data via user interface 216.

Figure 3:
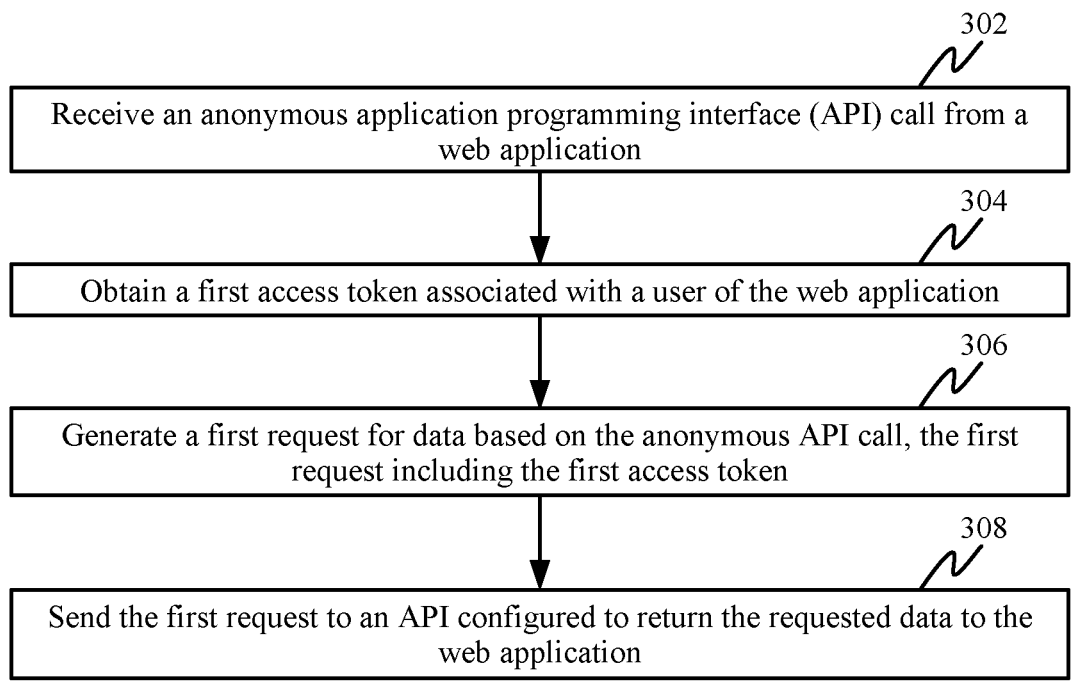
FIG. 3 depicts a flowchart of an example method performed by a network proxy for managing access to resources in accordance with an example embodiment.

Accordingly, access management to resources may be performed by a network proxy in various ways. For example, FIG. 3 depicts a flowchart 300 of an example method performed by a network proxy for managing access to resources in accordance with an example embodiment. In an embodiment, flowchart 300 may be implemented by system 200 of FIG. 2. Accordingly, the method of flowchart 300 will be described with continued reference to system 200 of FIG. 2, although the method is not limited to that implementation. Other structural and operational embodiments will be apparent to persons skilled in the relevant art(s) based on the discussion regarding flowchart 300 and system 200 of FIG. 2.

As shown in FIG. 3, the method of flowchart 300 begins at step 302. At step 302, an anonymous API call from a web application is received. For example, with reference to FIG. 2, outgoing network proxy 210 receives an anonymous API call 244 from web application 208.

At step 304, a first access token associated with a user of the web application is obtained. For example, with reference to FIG. 2, outgoing network proxy 210 obtains a first access token associated with a user of web application 208.

At step 306, a first request for data based on the anonymous API call is generated. The first request includes the first access token. For example, with reference to FIG. 2, outgoing network proxy 210 generates request 246 for data based on anonymous API call 244. Request 246 includes the access token associated with the user.

In accordance with one or more embodiments, a plurality of access tokens, each associated with a respective user is received from a second network proxy. The plurality of access tokens is stored in a data structure that maps each of the plurality of access tokens to the respective user to which the access token is associated. For example, with reference to FIG. 2, outgoing network proxy 210 receives a message 238 from incoming network proxy 204. Message 238 comprises an access token associated with a user that was successfully authenticated by identity endpoint 206 to use web application 208. Incoming network proxy 204 may provide a respective message 238 for each user that is successfully authenticated by identity endpoint 206. Outgoing network proxy 210 stores access tokens received via respective messages 238 in data structure 240. Data structure 240 maps each of the plurality of access tokens to the respective user to which the access token is associated. Each access token may comprise a user ID that is associated therewith.

In accordance with one or more embodiments, obtaining the first access token, as described above with reference to step 304, comprises retrieving the first access token from the data structure based on an identifier of the user. Generating the first request for data, as described above with reference to step 306, comprises storing the first access token into the header of the first request. For example, with reference to FIG. 2, outgoing network proxy 210 retrieves the first access token from data structure 240 based on an identifier of the user. The identifier of the user may be specified in anonymous API call 244. Outgoing network proxy 210 may store the retrieved access token into the header of request 246.

At step 308, the first request is sent to an API configured to return the requested data to the web application. For example, with reference to FIG. 2, outgoing network proxy 210 sends request 246 to web API 212.

A. Continuous Access Evaluation

Continuous access evaluation is a technique that enables a session between a client (browser application 214 or web application 208) and an API endpoint (e.g., web API 212) to be revoked in real-time based on a critical event or policy evaluation. The technique provides at least two benefits: security and outage resilience. With regards to security, it is ideal to immediately terminate access to data in several situations (e.g., a user leaving the company, in response to detecting a breach, determining that a password known has been leaked, etc.). In modern identity and access management solutions, access normally continues until a "token lifetime expiration" occurs, and today a common setting is for access tokens to be valid for 1 hour. With regards to outage resilience, because the identity provider is central to all secure access in the system, an outage in the identity provider can result in significant disruption to all business functions. One strategy to mitigate this is to extend the "token lifetime expiration" to 24 hours or more. However, this normally involves a difficult security tradeoff, allowing extended access into the system when a user account is known to be compromised. Having the ability to immediately terminate a session with all API endpoints allows for extended token lifetimes.

However, this requires a fair amount of work on the customer's service in order to call an API that is protected using continuous access evaluation. This work involves receiving and handling an authentication challenge response from the API endpoint after revocation occurs. If a revocation of a session occurs, the API endpoint sends a WWW-Authenticate header back to the client (with a HTTP 401 Unauthorized response). It is the job of the client to parse the header and find the claims parameter. This work also involves decoding the authentication claims challenge and acquiring a new access token. The client application is then responsible to decode the claims challenge and generate an authentication request to the token endpoint. This work further involves calling the API again with the new access token. Once the client app has a new access token, it has established a new session, and it needs to call the API again.

This can be an extremely high burden for an application developer because the application code could have dependencies on 100s of different APIs throughout the codebase. Adding this "error handling" throughout the codebase could be months of work. The techniques described herein remove this burden.

Figure 4:
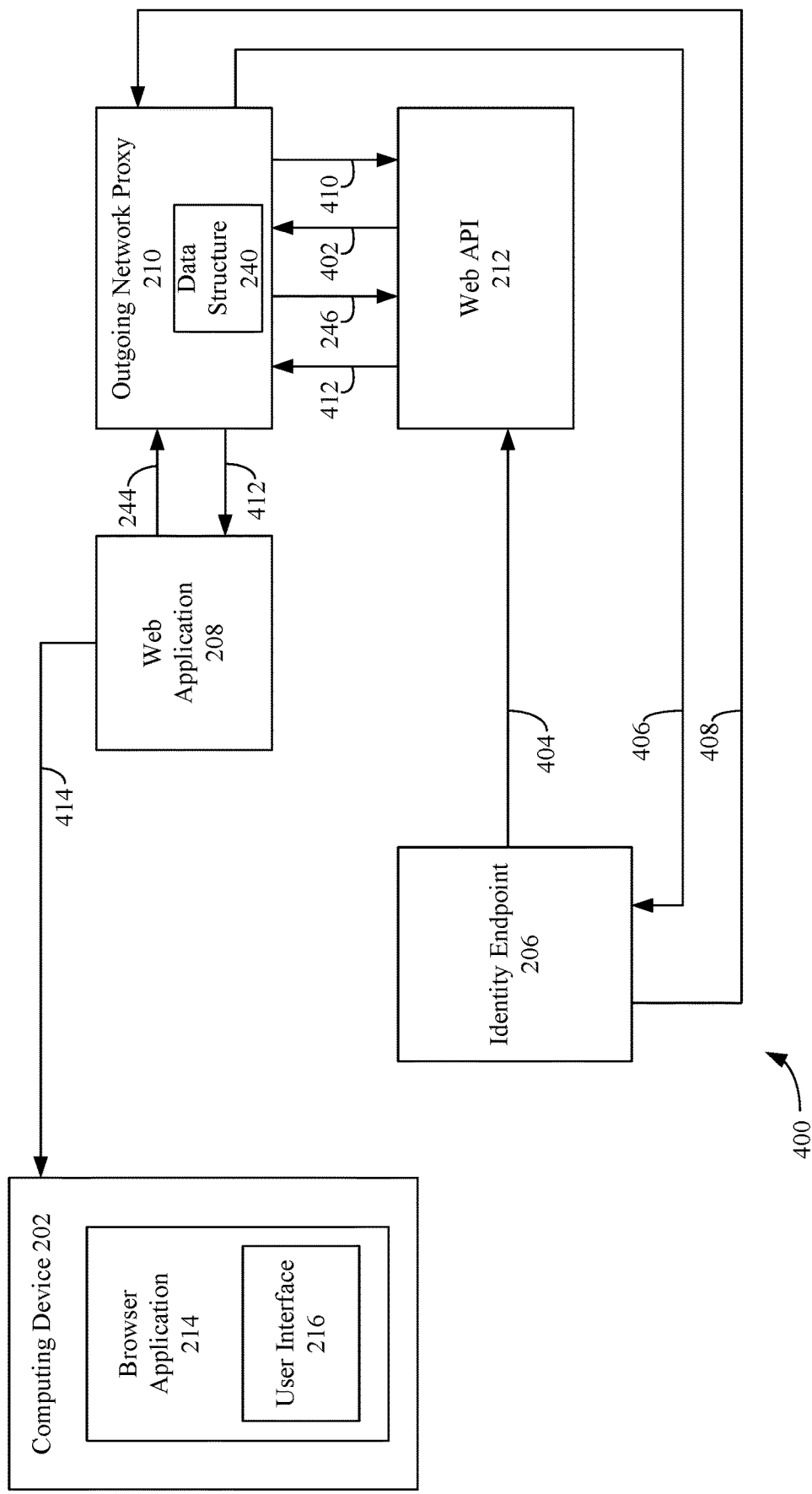
FIG. 4 is a block diagram of a system configured to remediate a revocation of access to a web application programming interface (API) in accordance with an example embodiment.

For instance, FIG. 4 is a block diagram of a system 400 configured to remediate a revocation of access to a web API in accordance with an example embodiment. As shown in FIG. 4, system 200 comprises computing device 202, identity endpoint 206, web application 208, outgoing network proxy 210, and web API 212. Incoming network proxy 204 is not shown for the sake of brevity.

As shown in FIG. 4, outgoing network proxy 210 generates outgoing request 246 (e.g., an HTTP GET request) to web API 212 for data (as described above with reference to FIG. 2). Web API 212 verifies whether request 246 includes the access token and determines whether the access token is valid. If web API 212 determines that the access token is invalid, web API 212 returns a claims challenge response 402 indicating that the access token is invalid. Claims challenge response 402 may specify a URI for identity endpoint 206. Web API 212 may determine that the access token is invalid based on a message 404 indicating as such received from identity endpoint 206. For example, in response to determining that the user's access is to be revoked, an administrator of identity endpoint 206 may cause identity endpoint 206 to send message 404 to outgoing network proxy 210. In another example, identity endpoint 206 may periodically send message 404 to outgoing network proxy 210. Message 404 may comprise a bloom filter that indicates which access tokens of various users have been revoked. Web API 212 may analyze the bloom filter to determine whether the access token included in outgoing request 246 is invalid.

In response to receiving claims challenge response 402, outgoing network proxy 210 attempts to obtain a new access token. Outgoing network proxy 210 may initially attempt a silent remediation, where outgoing network proxy 210 attempts to obtain a new access token from identity endpoint 206 without user intervention. For instance, outgoing network proxy 210 may retrieve a refresh token associated with the user from data structure 240. Outgoing network proxy 210 determines whether the refresh token has expired. If the refresh token is expired, outgoing network proxy 210 attempts to obtain a new access token via user intervention, which is described below with reference to FIG. 5. If the refresh token is not expired, outgoing network proxy 210 provides a request 406 comprising the refresh token to identity endpoint 206 (as identified by the URI of claims challenge response 402).

Identity endpoint 206 is configured to determine whether the refresh token included in request 406 is valid. In response to determining that the refresh token is valid, identity endpoint 206 issues a new access token for the user. Identity endpoint 206 sends a response 408 including the new access token to outgoing network proxy 210. In response to determining that the refresh token is invalid, identity endpoint 206 may provide a response to outgoing network proxy 210 indicating as such, and outgoing network proxy 210 attempts to obtain a new access token via user intervention (as will be described below with reference to FIG. 5).

In response to receiving response 408, outgoing network proxy 210 stores the new access token in data structure 240 and generates a new outgoing request 410 (e.g., an HTTP GET request) to web API 212 for the data. Outgoing request 410 includes the new access token. Web API 212 verifies whether request 410 includes the access token and determines whether the access token is valid. If web API 212 determines that the access token is valid, web API 212 returns a response 412 with the requested data outgoing network proxy 210, which provides response 412 to web application 208. Web application 208 may provide the requested data (shown as data 414) to browser application 214 and/or renders the requested data via user interface 216.

Figure 5:
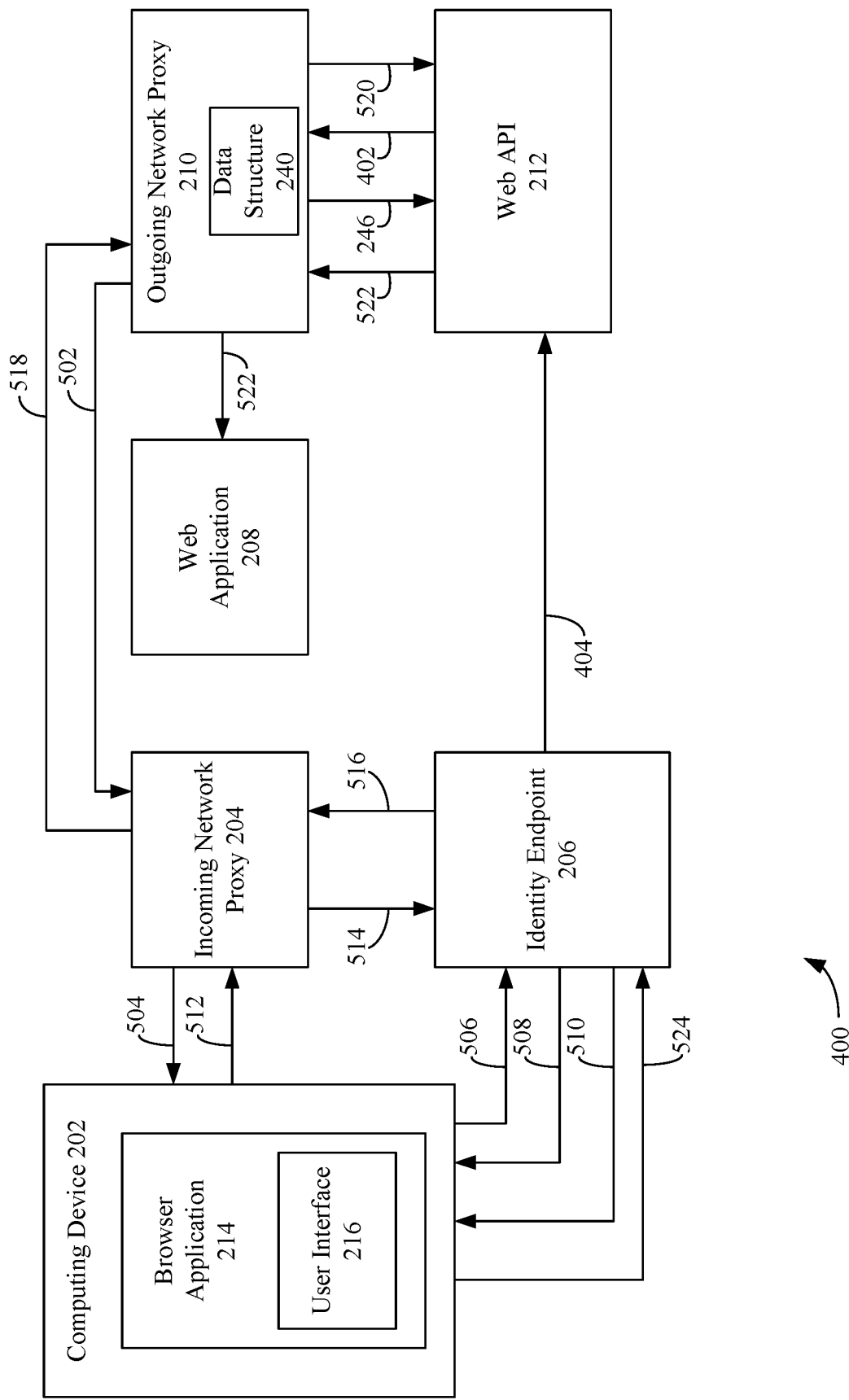
FIG. 5 is a block diagram of a system configured to remediate a revocation of access to a web API in accordance with another example embodiment.

In the event that silent remediation is unsuccessful, outgoing network proxy 210 attempts to obtain a new access token via user intervention. For example, FIG. 5 is a block diagram of a system 500 configured to remediate a revocation of access to a web API via user intervention in accordance with an example embodiment. As shown in FIG. 5, system 200 comprises computing device 202, incoming network proxy 204, identity endpoint 206, web application 208, outgoing network proxy 210, and web API 212.

In the example shown in FIG. 5, in response to receiving claims challenge response 402 (and in the event silent remediation was unsuccessful or unavailable), outgoing network proxy 210 sends a claims request 502 to incoming network proxy 204. Claims request 502 includes the URI of identity endpoint 206 (as identified in claims challenge response 402).

Responsive to receiving claims request 502, incoming network proxy 204 causes browser application 214 to redirect to the web page associated with identity endpoint 206. For example, incoming network proxy 404 may provide a redirect message 504 (e.g., a HTTP response having a status code in the range 300-399) to computing device 202. Redirect message 504 further specifies the URI of a web page of identity endpoint 206. Responsive to receiving redirect message 504, browser application 214 provides a request 506 (e.g., an HTTP GET request) to identity endpoint 206. Identity endpoint 206 provides a response 508 comprising data (e.g., HTML) that browser application 214 utilizes to render the web page of identity endpoint 206 via user interface 216. The web page to which browser application 214 is redirected prompts the user to enter and/or establish new authentication (e.g., sign-in) credentials for web application 208 via user interface 216. For instance, the web page may prompt the user to establish a new username and/or password, to establish new PIN, to implement multifactor authentication (MFA), etc. After entering and/or establishing new authentication credentials, browser application 214 provides a request 524 comprising the new authentication credentials to identity endpoint 206. For example, request 524 may be an HTTP POST request. Identity endpoint 206 receives request 524 and, in response, provides a response 510 to browser application 214. Response 510 may be a redirect message that includes the secret code that is specific to the user and may further specify a redirect URI identifying incoming network proxy 204. Responsive to receiving response 510, browser application 214 redirects to incoming network proxy 204. For instance, browser application 214 provides a request 512 (e.g., an HTTP GET response) for data to incoming network proxy 204. Request 510 may specify the data being requested and also includes the secret code. Incoming network proxy 204 provides a request 514 comprising the secret code to identity endpoint 206. In response, identity endpoint 206 verifies whether the secret code received from incoming network proxy 204 via request 514 is the same as the secret code that it provided to browser application 214 via response 510. In response to determining that the secret codes match, identity endpoint 206 provides a response 516 that includes the new access token and/or a new refresh token back to incoming network proxy 204.

Incoming network proxy 204 provides a message 518 to outgoing network proxy 210, which includes the new access token and/or new refresh token. Outgoing network proxy 210 stores the new access token and/or new refresh token in data structure 240. Outgoing network proxy 210 generates a new outgoing request 520 (e.g., an HTTP GET request) to web API 212 for the data. Outgoing request 520 includes the new access token. Web API 212 verifies whether request 520 includes the access token and determines whether the access token is valid. If web API 212 determines that the access token is valid, web API 212 returns a response 522 with the requested data to outgoing network proxy 210, which provides response 522 to web application 208. Web application 208 may provide the requested data to browser application 214 and/or renders the requested data via user interface 216.

Figure 6:
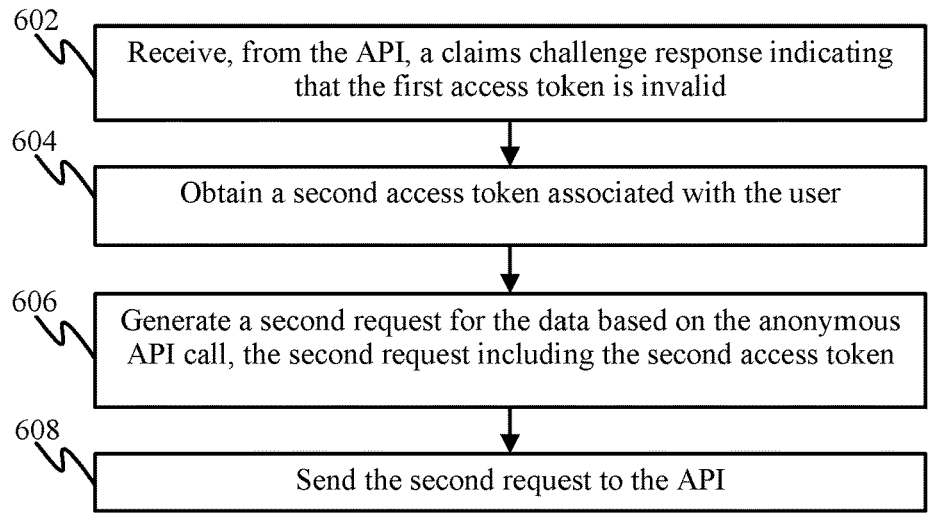
FIG. 6 depicts a flowchart of an example method performed by a network proxy for remediating a revocation of access to a web API in accordance with an example embodiment.

Accordingly, a revocation of access to a web API may be mitigated in many ways. For example, FIG. 6 depicts a flowchart 600 of an example method performed by a network proxy for remediating a revocation of access to a web API in accordance with an example embodiment. In an embodiment, flowchart 600 may be implemented by system 400 of FIG. 4. Accordingly, the method of flowchart 300 will be described with continued reference to system 400 of FIG. 4, although the method is not limited to that implementation. Other structural and operational embodiments will be apparent to persons skilled in the relevant art(s) based on the discussion regarding flowchart 600 and system 400 of FIG. 4.

As shown in FIG. 6, the method of flowchart 600 begins at step 602. At step 602, a claims challenge response is received from the API. The claims challenge response indicates that the first access token is invalid. For example, with reference to FIG. 4, outgoing network proxy 210 receives claims challenge response 402 from web API 212. Claims challenge response 402 indicates that the access token is invalid.

At step 604, a second access token associated with the user is obtained. For example, with reference to FIG. 4, outgoing network proxy 210 obtains the second access token.

In accordance with one or more embodiments, outgoing network proxy 210 utilizes a silent remediation technique to obtain the second access token. Additional details regarding the silent remediation technique are described below with reference to FIG. 7.

In accordance with one or more embodiments, outgoing network proxy 210 obtains the second access token via user interaction. Additional details regarding such a technique are described below with reference to FIG. 8.

At step 606, a second request for the data is generated based on the anonymous API call. The second request includes the second access token. For example, with reference to FIG. 4, outgoing network proxy 210 generates request 410 for the data. Request 410 is based on the initial anonymous API call generated by web application 208 (e.g., anonymous API call 244, as described above with reference to FIG. 2). For instance, request 410 may specify the same data that was specified by API call 244.

At step 608, the second request is sent to the API. For example, with reference to FIG. 4, request 410 is sent to web API 212.

Figure 7:
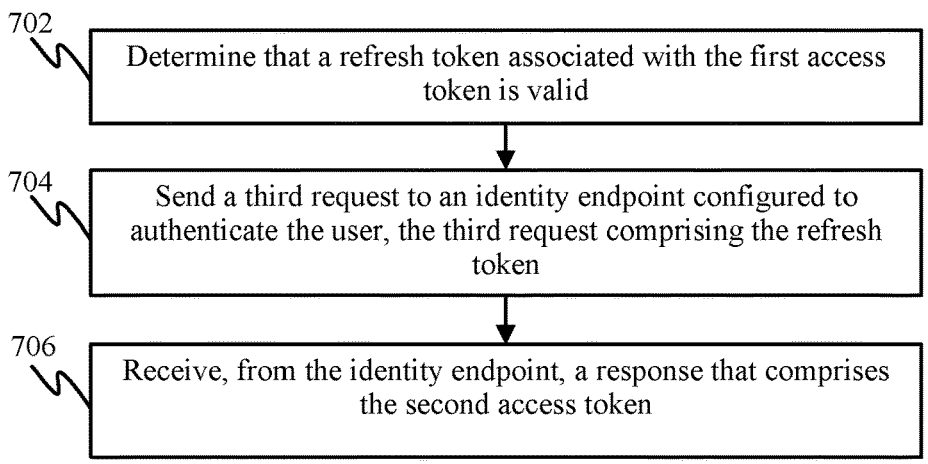
FIG. 7 depicts a flowchart of an example method performed by a network proxy for obtaining a new access token in accordance with an example embodiment.

FIG. 7 depicts a flowchart 700 of an example method performed by a network proxy for obtaining a new access token in accordance with an example embodiment. In an embodiment, flowchart 700 may be implemented by system 400 of FIG. 4. Accordingly, the method of flowchart 700 will be described with continued reference to system 400 of FIG. 4, although the method is not limited to that implementation. Other structural and operational embodiments will be apparent to persons skilled in the relevant art(s) based on the discussion regarding flowchart 700 and system 400 of FIG. 4.

As shown in FIG. 7, the method of flowchart 700 begins at step 702. At step 702, a refresh token associated with the first access token is determined to be valid. For example, with reference to FIG. 4, outgoing network proxy 210 retrieves the refresh token associated with the user's access token from data structure 240 and determines whether the refresh token has expired. If the refresh token is not expired, outgoing network proxy 210 determines that the refresh token is valid. Otherwise, outgoing network proxy 210 determines that the refresh token is invalid.

At step 704, a third request is sent to an identity endpoint that is configured to authenticate the user. The third request comprises the refresh token. For example, with reference to FIG. 4, responsive to determining that the refresh token is valid, outgoing network proxy 210 provides request 406 comprising the refresh token to identity endpoint 206 (as identified by the URI of claims challenge response 402).

At step 706, a response that comprises the second access token is received from the identity endpoint. For example, with reference to FIG. 4, identity endpoint 206 is configured to determine whether the refresh token included in request 406 is valid. In response to determining that the refresh token is valid, identity endpoint 206 issues a new access token for the user. Identity endpoint 206 sends response 408 including the new access token to outgoing network proxy 210.

Figure 8:
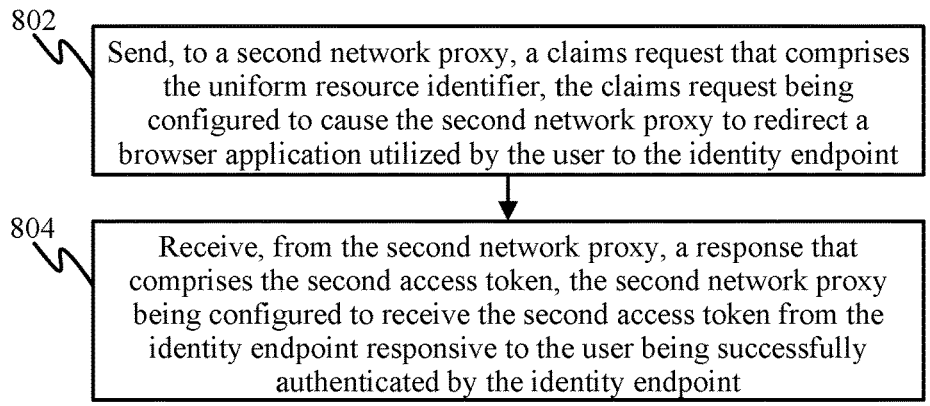
FIG. 8 depicts a flowchart of an example method performed by a network proxy for obtaining a new access token in accordance with another example embodiment.

FIG. 8 depicts a flowchart 800 of an example method performed by a network proxy for obtaining a new access token in accordance with another example embodiment. In an embodiment, flowchart 800 may be implemented by system 500 of FIG. 5. Accordingly, the method of flowchart 800 will be described with continued reference to system 500 of FIG. 5, although the method is not limited to that implementation. Other structural and operational embodiments will be apparent to persons skilled in the relevant art(s) based on the discussion regarding flowchart 800 and system 500 of FIG. 5.

As shown in FIG. 8, the method of flowchart 800 begins at step 802. At step 802, a claims request that comprises the uniform resource identifier of the identity endpoint included in the claims challenge response is sent to a second network proxy. The claims request is configured to cause the second network proxy to redirect a browser application utilized by the user to the identity endpoint. For example, with reference to FIG. 5, outgoing network proxy 210 sends claims request 502 to incoming network proxy 204. Claims request 502 includes the URI of identity endpoint 206 included in claims challenge response 402 provided by web API 212. Claims request 502 causes incoming network proxy 204 to redirect browser application 214 to identity endpoint 206. For example, incoming network proxy 204 may provide a redirect message 504 (e.g., a HTTP response having a status code in the range 300-399) to computing device 202. Redirect message 504 specifies the URI of a web page of identity endpoint 206.

At step 804, a response that comprises the second access token is received from the second network proxy. The second network proxy is configured to receive the second access token from the identity endpoint responsive to the user being successfully authenticated by the identity endpoint. For example, with reference to FIG. 5, outgoing network proxy 210 receives message 518 from incoming network proxy 204, which includes the second access token. Incoming network proxy 204 provides message 518 responsive to identity endpoint 206 successfully authenticating the user (responsive to the user updating the authentication credentials). For instance, identity endpoint 206 may provide a response 516 to incoming network proxy 204 that includes the second access token responsive to the user being successfully authenticated.

B. Incremental Consent

Incremental consent is a technique that that allows a user to consent to an application "just in time" when specific data needs to be accessed. An example might be an application that wants to access a calendar when scheduling a meeting. If the application asks for too many permissions upfront, a user may decline to use the application altogether, but if an application asks for minimal permissions upfront, and then asks for additional information (e.g., calendar-related information after the user clicks on button saying "schedule meeting") then the context of why the application requires access to read their calendar information makes sense, and the user is more likely to grant permission for the application to access such information.

Figure 9:
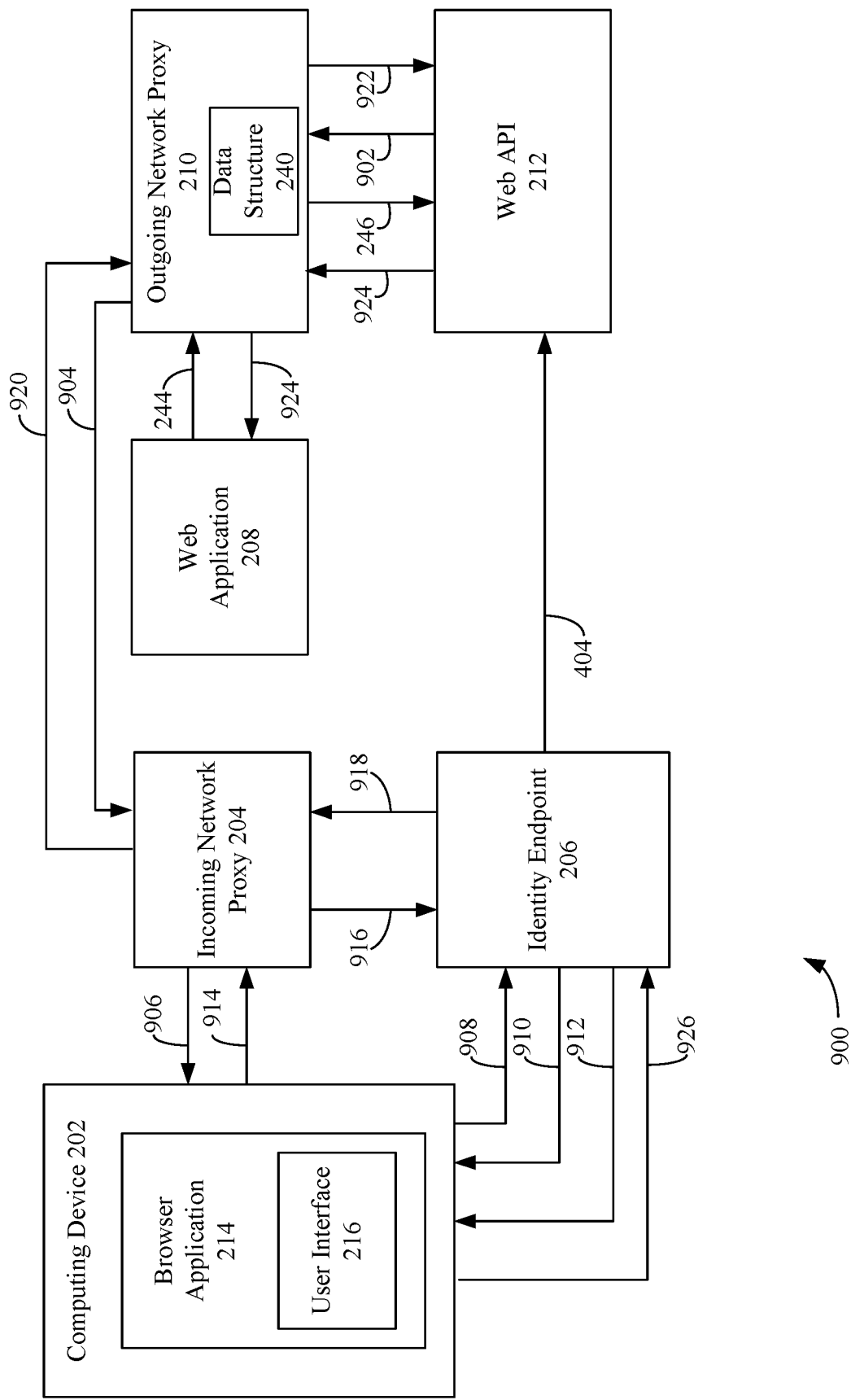
FIG. 9 is a block diagram of a system configured to enable a user to provide consent for different access permissions in accordance with an example embodiment.

For instance, FIG. 9 is a block diagram of a system 900 configured to enable a user to provide consent for different access permissions in accordance with an example embodiment. As shown in FIG. 9, system 900 comprises computing device 202, incoming network proxy 204, identity endpoint 206, web application 208, outgoing network proxy 210, and web API 212.

As described above, web application 208 may issue an anonymous API call 244 for data. In an example, the data may be information associated with the user's calendar application. Responsive to receiving anonymous API call 244, outgoing network proxy 210 generates outgoing request 246 to web API 212 based on API call 244. Request 246 includes the access token associated with the user identified by API call 244. In accordance with an embodiment, the access token is associated with a set of permissions granted to web application 208. For instance, the set of permissions may allow web application 208 to access certain types of data (e.g., emails, tasks, documents, etc.) via web API 212.

Web API 212 verifies whether request 246 includes the access token and determines whether the access token is valid and is associated with permissions that grant web application 208 access to the data (e.g., calendar-related information) requested via request 246. For instance, the access token may comprise a data structure that specifies the permissions that the user has granted for web application 208. If web API 212 determines that the access token is not associated with the proper permissions, web API 212 returns a response 902 indicating that the access token is not associated with the proper permissions. Response 902 may specify a URI for identity endpoint 206.

In response to receiving response 902, outgoing network proxy 210 sends a request 904 to incoming network proxy 204. Request 904 includes the URI of identity endpoint 206 (as identified in response 902) and the permission for which authorization is required.

Responsive to receiving request 904, incoming network proxy 204 causes browser application 214 to redirect to the web page associated with identity endpoint 206. For example, incoming network proxy 204 may provide a redirect message 906 (e.g., a HTTP response having a status code in the range 300-399) to computing device 202. Redirect message 906 further specifies the URI of a web page of identity endpoint 206 and the permission for which authorization is required.

Responsive to receiving redirect message 906, browser application 214 provides a request 908 (e.g., an HTTP GET request) to identity endpoint 206. Request 908 may specify the permission for which authorization is required. Identity endpoint 206 provides a response 910 comprising data (e.g., HTML that browser application 214 utilizes to render the web page of identity endpoint 206 via user interface 216. The web page to which browser application 214 is redirected prompts the user to authorize web application 208 to have access to the data requested via anonymous API call 244 (in accordance with the permission specified in request 908). For instance, the web page may display a dialog box that describes the data which is attempted to be accessed as well as an option to authorize or decline the permission. After providing user input that grants permission to access the requested data, browser application 214 provides a request 926 that indicates that the user has granted permission to. For instance, request 926 may be an HTTP POST request. Identity endpoint 206 receives request 926 and, in response, provides a response 912 to browser application 214. Response 912 may be a redirect message that includes the secret code that is specific to the user and may further specify a redirect URI identifying incoming network proxy 204.

Responsive to receiving response 912, browser application 214 redirects to incoming network proxy 204. For instance, browser application 214 provides a request 914 (e.g., an HTTP GET response) for data to incoming network proxy 204. Request 914 may specify the data being requested and also includes the secret code. Incoming network proxy 204 provides a request 916 comprising the secret code to identity endpoint 206. In response, identity endpoint 206 verifies whether the secret code received from incoming network proxy 204 via request 916 is the same as the secret code that it provided to browser application 214 via response 912. In response to determining that the secret codes match, identity endpoint 206 provides a response 918 that includes a new access token and that is now associated with the newly-granted permission to incoming network proxy 204.

Incoming network proxy 204 provides a message 920 to outgoing network proxy 210, which includes the new access token. Outgoing network proxy 210 stores the new access token in data structure 240. Outgoing network proxy 210 generates a new outgoing request 922 (e.g., an HTTP GET request) to web API 212 for the data. Outgoing request 922 includes the new access token. Web API 212 verifies whether request 922 includes the access token and determines whether the access token is associated with a valid permission to access the requested data. If web API 212 determines that the access token is associated with the valid permission, web API 212 returns a response 924 with the requested data to outgoing network proxy 210, which provides response 924 to web application 208. Web application 208 may provide the requested data to browser application 214 and/or renders the requested data via user interface 216.

The foregoing techniques may be performed for each type of data that is requested. Once an access token is associated with permissions to access a particular type of data (and so long as the access token has not expired), a user may no longer be prompted to authorize web application 208 to access that type of data, and web application 208 may retrieve the requested data from web API 212.

Figure 10:
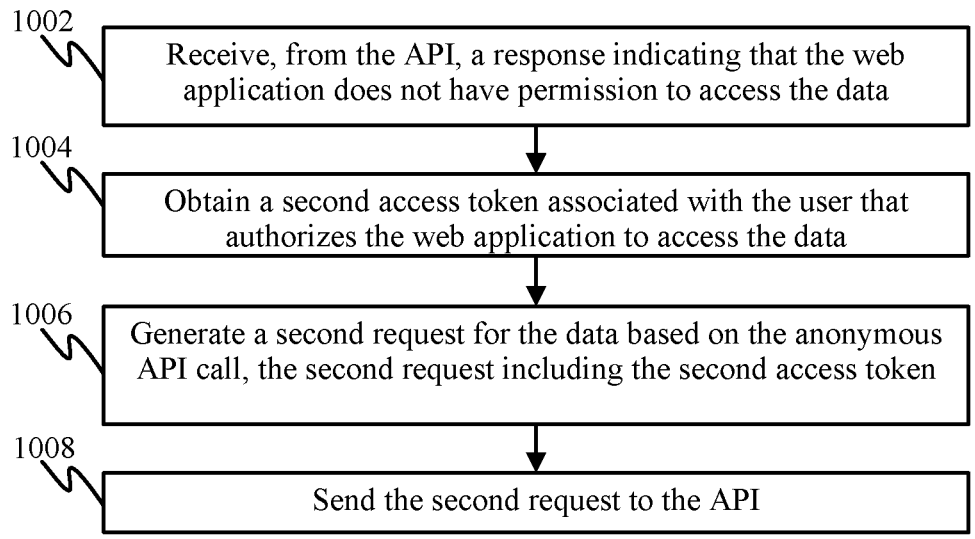
FIG. 10 depicts a flowchart of an example method performed by a network proxy for granting permissions to a web application in accordance with an example embodiment.

Accordingly, a web application may be granted permissions to access data in many ways. For example, FIG. 10 depicts a flowchart 1000 of an example method performed by a network proxy for granting permissions to a web application in accordance with an example embodiment. In an embodiment, flowchart 1000 may be implemented by system 900 of FIG. 9. Accordingly, the method of flowchart 1000 will be described with continued reference to system 900 of FIG. 9, although the method is not limited to that implementation. Other structural and operational embodiments will be apparent to persons skilled in the relevant art(s) based on the discussion regarding flowchart 1000 and system 900 of FIG. 9.

As shown in FIG. 10, the method of flowchart 1000 begins at step 1002. At step 1002, a response is received from the API. The response indicates that the web application does not have permission to access data requested thereby. For example, with reference to FIG. 9, outgoing network proxy 210 receives response 902 from web API 212. Response 902 indicates that the access token provided via outgoing request 246 is not associated with a permission that enables web application 208 to access the requested data.

At step 1004, a second access token associated with the user that authorizes the web application to access the data is obtained. For example, with reference to FIG. 9, outgoing network proxy 210 obtains the second access token. Additional details regarding obtaining the second access token are described below with reference to FIG. 11.

At step 1006, a second request for the data is generated based on the anonymous API call. The second request includes the second access token. For example, with reference to FIG. 9, outgoing network proxy 210 generates request 920 for the data. Request 920 includes the second access token obtained by outgoing network proxy 210. The second access token may be included in the header of request 922. Request 922 is based on the initial anonymous API call generated by web application 208 (e.g., anonymous API call 244, as described above with reference to FIG. 2). For instance, request 922 may specify the same data that was specified by API call 244.

At step 1008, the second request is sent to the API. For example, with reference to FIG. 9, request 922 is sent to web API 212.

Figure 11:
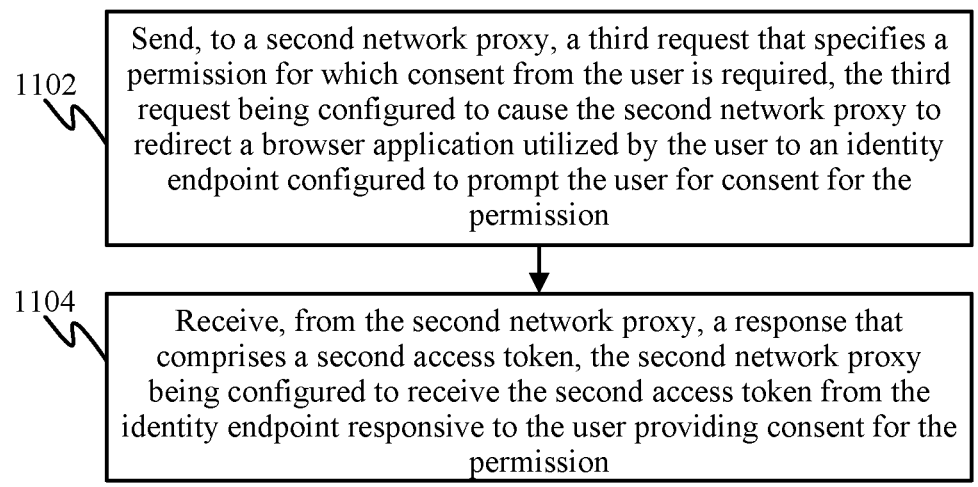
FIG. 11 depicts a flowchart of an example method performed by a network proxy for obtaining a new access token that is associated with additional permissions to access data in accordance with an example embodiment.

FIG. 11 depicts a flowchart 1100 of an example method performed by a network proxy for obtaining a new access token that is associated with additional permissions to access data in accordance with an example embodiment. In an embodiment, flowchart 1100 may be implemented by system 900 of FIG. 9. Accordingly, the method of flowchart 1100 will be described with continued reference to system 900 of FIG. 9, although the method is not limited to that implementation. Other structural and operational embodiments will be apparent to persons skilled in the relevant art(s) based on the discussion regarding flowchart 1100 and system 900 of FIG. 9.

As shown in FIG. 11, the method of flowchart 1100 begins at step 1102. At step 1102, a third request that specifies a permission for which consent from the user is required is sent to a second network proxy. The third request is configured to cause the second network proxy to redirect a browser application utilized by the user to the identity endpoint. For example, with reference to FIG. 9, outgoing network proxy 210 sends request 904 to incoming network proxy 204. Request 904 may include the URI of identity endpoint 206 and may specify the permission for which authorization is required. Request 904 causes incoming network proxy 204 to redirect browser application 214 to identity endpoint 206. For example, incoming network proxy 204 may provide a redirect message 906 (e.g., a HTTP response having a status code in the range 300-399) to computing device 202. Redirect message 906 specifies the URI of a web page of identity endpoint 206 and may specify the permission for which authorization is required.

At step 1104, a response that comprises the second access token is received from the second network proxy. The second network proxy is configured to receive the second access token from the identity endpoint responsive to the user providing consent for the permission. For example, with reference to FIG. 9, outgoing network proxy 210 receives message 920 from incoming network proxy 204, which includes the second access token. Incoming network proxy 204 provides message 920 responsive to the user providing consent for the permission (e.g., via the prompt provided via the web page of identity endpoint 206, as described above with reference to FIG. 9). For instance, identity endpoint 206 may provide a response 918 to incoming network proxy 204 that includes the second access token responsive to the user providing consent for the permission.

C. Token Binding

Token binding is a technique that prevents exfiltration of access tokens to a different device if the machine is compromised by an attacker. This may be achieved by strong binding of the access token to key material inside a secure environment (e.g., a trusted platform module (TPM)) chip or enclave that cannot be extracted. The access token is placed in a digital envelope signed by the key material (which can only be done on the computing device on which the secure environment is included).

Figure 12:
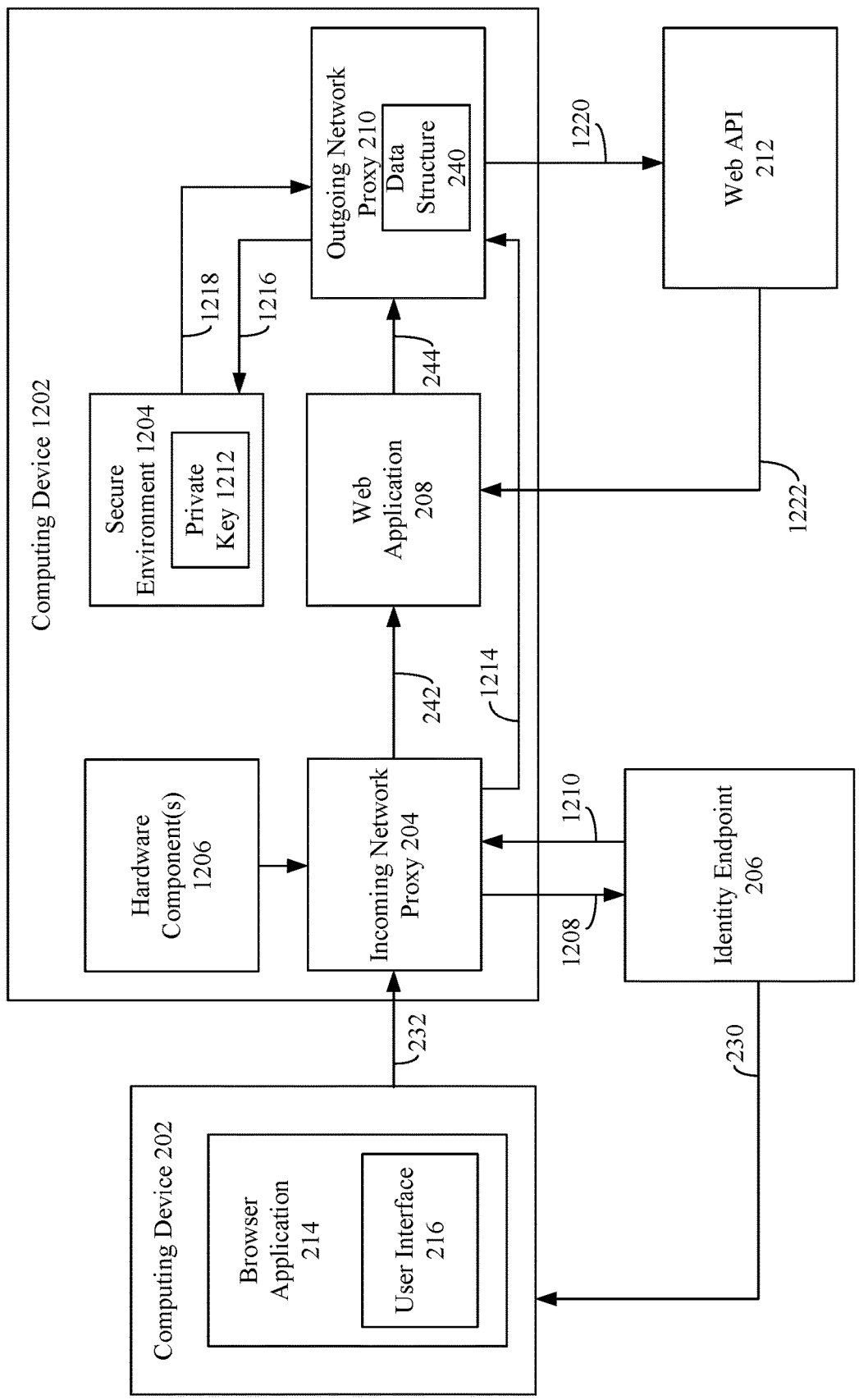
FIG. 12 is a block diagram of a system configured to enable token binding in accordance with an example embodiment.

For instance, FIG. 12 is a block diagram of a system 1200 configured to enable token binding in accordance with an example embodiment. As shown in FIG. 12, system 1200 comprises computing device 202, identity endpoint 206, web API 212 and a computing device 1202, which are communicatively coupled via network(s) (e.g., network(s) 118, as described above with reference to FIG. 1). Computing device 1202 comprises a secure environment 1204. Secure environment 1204 may comprise a TPM, a hardware security module (HSM), or any type of secure hardware and/or software-based cryptoprocessor. In accordance with an embodiment, computing device 1202 is a server or any other type of computing device as described herein.

As described above with reference to FIG. 2, identity endpoint 206 may cause the user to enter authentication credentials for web application 208. Responsive to receiving valid authentication credentials, identity endpoint 206 provides response 230 to browser application 214. Response 230 may be a redirect message that includes a secret code (e.g., a string of alphanumeric characters) that is specific to the user and may further specify a redirect URI identifying to computing device 1202.

Responsive to receiving response 230, browser application 214 redirects to computing device 1202. For instance, browser application 214 provides a request 232 (e.g., an HTTP GET response) for data to computing device 1202. Request 232 may specify the data being requested and also includes the secret code. Responsive to receiving request 232, incoming network proxy 204 of computing device 1202 obtains hardware binding data associated with computing device 1202. The hardware binding data may be based on a private key 1212 stored in secure environment 1204. Private key 1212 may be generated by secure environment 1204 and is non-exportable. Thus, private key 1212 is not enabled to be transferred to another device.

Incoming network proxy 204 provides a request 1208 comprising the secret code and hardware binding data to identity endpoint 206. In response, identity endpoint 206 verifies whether the secret code received from incoming network proxy 204 via request 1208 is the same as the secret code that it provided to browser application 214 (e.g., via response 230, as described above with reference to FIG. 2). In response to determining that the secret codes match, identity endpoint 206 generates an access token and/or a refresh token that is bound to computing device 1202 based on the hardware binding data and provides a response 1210 that includes the access token and/or the associated refresh token back to incoming network proxy 204.

Incoming network proxy 204 provides a message 1214 to outgoing network proxy 210, which includes the access token and/or refresh token. Outgoing network proxy 210 stores the access token and/or refresh token in data structure 240.

Incoming network proxy 204 may then generate request 242, which specifies the data requested by browser application 214 and may include an identifier of the user that initiated the request. Incoming network proxy 204 provides request 242 to web application 208. Web application 208 may then issue anonymous API call 244, which is provided to outgoing network proxy 210.

Responsive to receiving anonymous API call 244, outgoing network proxy 210 obtains the access token associated with the user and includes the access token in a digital envelope. Outgoing network proxy 210 provides the digital envelope to secure environment 1204 via a request 1216. Secure environment 1204 is configured to sign the digital envelope using private key 1212 maintained thereby and provides the signed digital envelope to outgoing network proxy 210 via a response 1218.

Outgoing network proxy 210 generates an outgoing request 1220 (e.g., an HTTP GET request) to web API 212 that includes the signed digital envelope. Outgoing network proxy 210 may include the signed digital envelope in the header of request 1220.

Web API 212 validates the signature of the digital envelope received via request 1220 using a corresponding public key. A successful validation of the signature proves that the entity that signed the digital envelope (i.e., secure environment 1204) has the private key (i.e., private key 1212).

If web API 212 successfully validates the signature of the digital envelope, web API 212 returns a response 1222 with the requested data to web application 208. Web application 208 may provide the requested data to browser application 214 and/or renders the requested data via user interface 216.

III. Example Mobile and Stationary Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including in FIGS. 1-12, along with any modules, components and/or subcomponents thereof, as well as the flowcharts/flow diagrams described herein, including portions thereof, and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), and/or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 13:
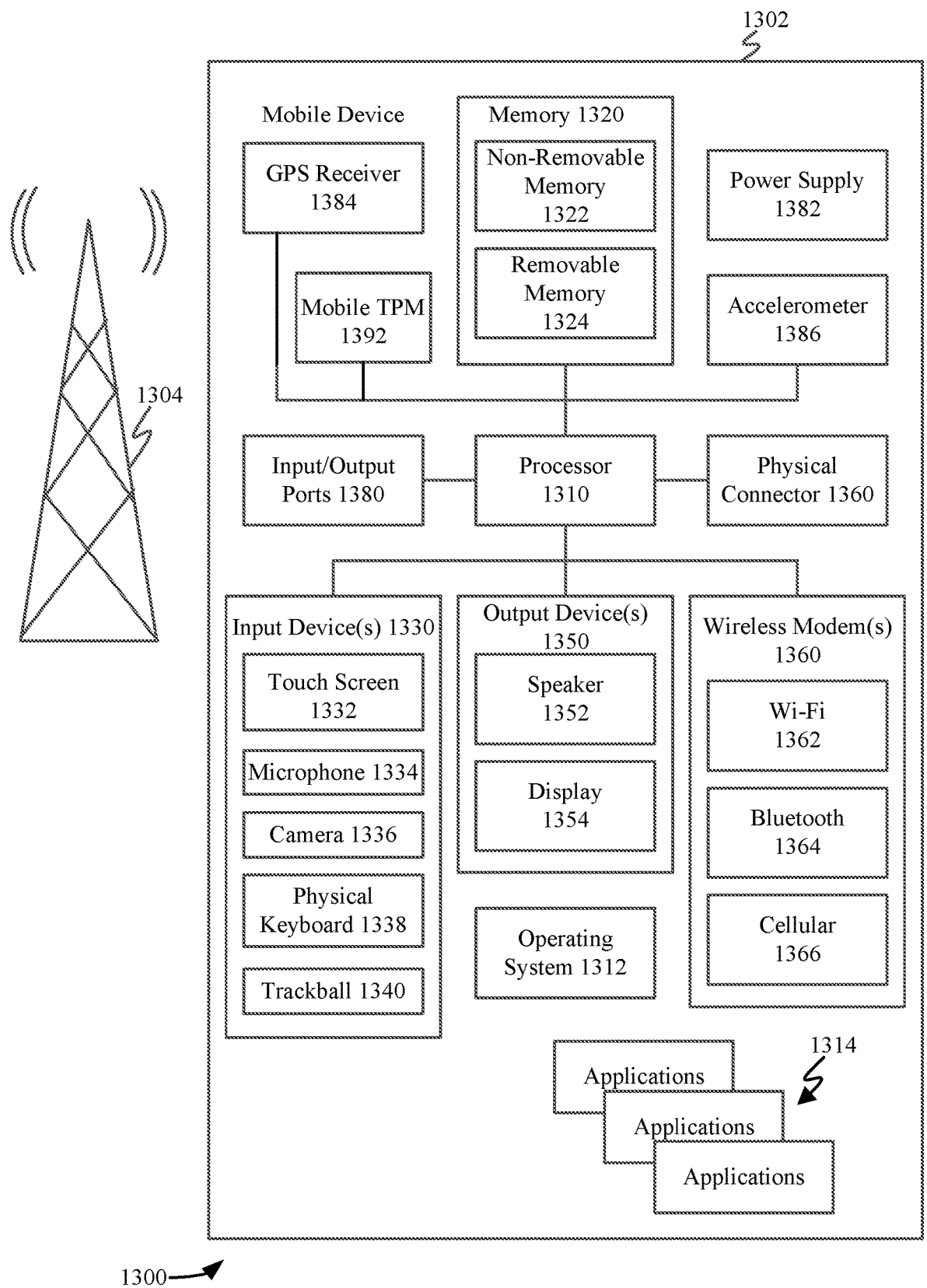
FIG. 13 is a block diagram of an exemplary user device in which embodiments may be implemented.

FIG. 13 is a block diagram of an exemplary mobile system 1300 that includes a mobile device 1302 that may implement embodiments described herein. For example, mobile device 1302 may be used to implement any system, client, or device, or components/subcomponents thereof, in the preceding sections. As shown in FIG. 13, mobile device 1302 includes a variety of optional hardware and software components. Any component in mobile device 1302 can communicate with any other component, although not all connections are shown for ease of illustration. Mobile device 1302 can be any of a variety of computing devices (e.g., cell phone, smart phone, handheld computer, Personal Digital Assistant (PDA), etc.) and can allow wireless two-way communications with one or more mobile communications networks 1304, such as a cellular or satellite network, or with a local area or wide area network.

Mobile device 1302 can include a controller or processor 1310 (e.g., signal processor, microprocessor, ASIC, or other control and processing logic circuitry) for performing such tasks as signal coding, data processing, input/output processing, power control, and/or other functions. An operating system 1312 can control the allocation and usage of the components of mobile device 1302 and provide support for one or more application programs 1314 (also referred to as "applications" or "apps"). Application programs 1314 may include common mobile computing applications (e.g., e-mail applications, calendars, contact managers, web browsers, messaging applications) and any other computing applications (e.g., word processing applications, mapping applications, media player applications).

Mobile device 1302 can include memory 1320. Memory 1320 can include non-removable memory 1322 and/or removable memory 1324. Non-removable memory 1322 can include RAM, ROM, flash memory, a hard disk, or other well-known memory devices or technologies. Removable memory 1324 can include flash memory or a Subscriber Identity Module (SIM) card, which is well known in GSM communication systems, or other well-known memory devices or technologies, such as "smart cards." Memory 1320 can be used for storing data and/or code for running operating system 1312 and application programs 1314. Example data can include web pages, text, images, sound files, video data, or other data to be sent to and/or received from one or more network servers or other devices via one or more wired or wireless networks. Memory 1320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1320. These programs include operating system 1312, one or more application programs 1314, and other program modules and program data. Examples of such application programs or program modules may include, for example, computer program logic (e.g., computer program code or instructions) for implementing one or more of incoming network proxy 104, web application 108, outgoing network proxy 110, identity endpoint 106, web API 112, browser application 114, incoming network proxy 204, web application 208, outgoing network proxy 210, identity endpoint 206, web API 212, browser application 214, secure environment 1204, along with any components and/or subcomponents thereof, as well as the flowcharts/flow diagrams described herein (e.g., flowchart 600, flowchart 700, flowchart 800, flowchart 1000, and/or flowchart 1100), including portions thereof, and/or further examples described herein.

Mobile device 1302 can include a mobile TPM 1392. Mobile TPM may be a mobile device equivalent embodiment of the TPMs or secure environments (e.g., secure environment 1204) described herein, as would be understood by one of skill in the relevant art(s) having the benefit of this disclosure. For example, mobile TPM 1492 may be configured to perform one or more functions or operations as described for TPMs herein.

Mobile device 1302 can support one or more input devices 1330, such as a touch screen 1332, a microphone 1334, a camera 1336, a physical keyboard 1338 and/or a trackball 1340 and one or more output devices 1350, such as a speaker 1352 and a display 1354. Other possible output devices (not shown) can include piezoelectric or other haptic output devices. Some devices can serve more than one input/output function. For example, touch screen 1332 and display 1354 can be combined in a single input/output device. Input devices 1330 can include a Natural User Interface (NUI).

One or more wireless modems 1360 can be coupled to antenna(s) (not shown) and can support two-way communications between processor 1310 and external devices, as is well understood in the art. Modem 1360 is shown generically and can include a cellular modem 1366 for communicating with the mobile communication network 1304 and/or other radio-based modems (e.g., Bluetooth 1364 and/or Wi-Fi 1362). At least one wireless modem 1360 is typically configured for communication with one or more cellular networks, such as a GSM network for data and voice communications within a single cellular network, between cellular networks, or between the mobile device and a public switched telephone network (PSTN).

Mobile device 1302 can further include at least one input/output port 1380, a power supply 1382, a satellite navigation system receiver 1384, such as a Global Positioning System (GPS) receiver, an accelerometer 1386, and/or a physical connector 1390, which can be a USB port, IEEE 1394 (FireWire) port, and/or RS-232 port. The illustrated components of mobile device 1302 are not required or all-inclusive, as any components can be deleted and other components can be added as would be recognized by one skilled in the art.

In an embodiment, mobile device 1302 is configured to implement any of the above-described features of flowcharts herein. Computer program logic for performing any of the operations, steps, and/or functions described herein may be stored in memory 1320 and executed by processor 1310.

Figure 14:
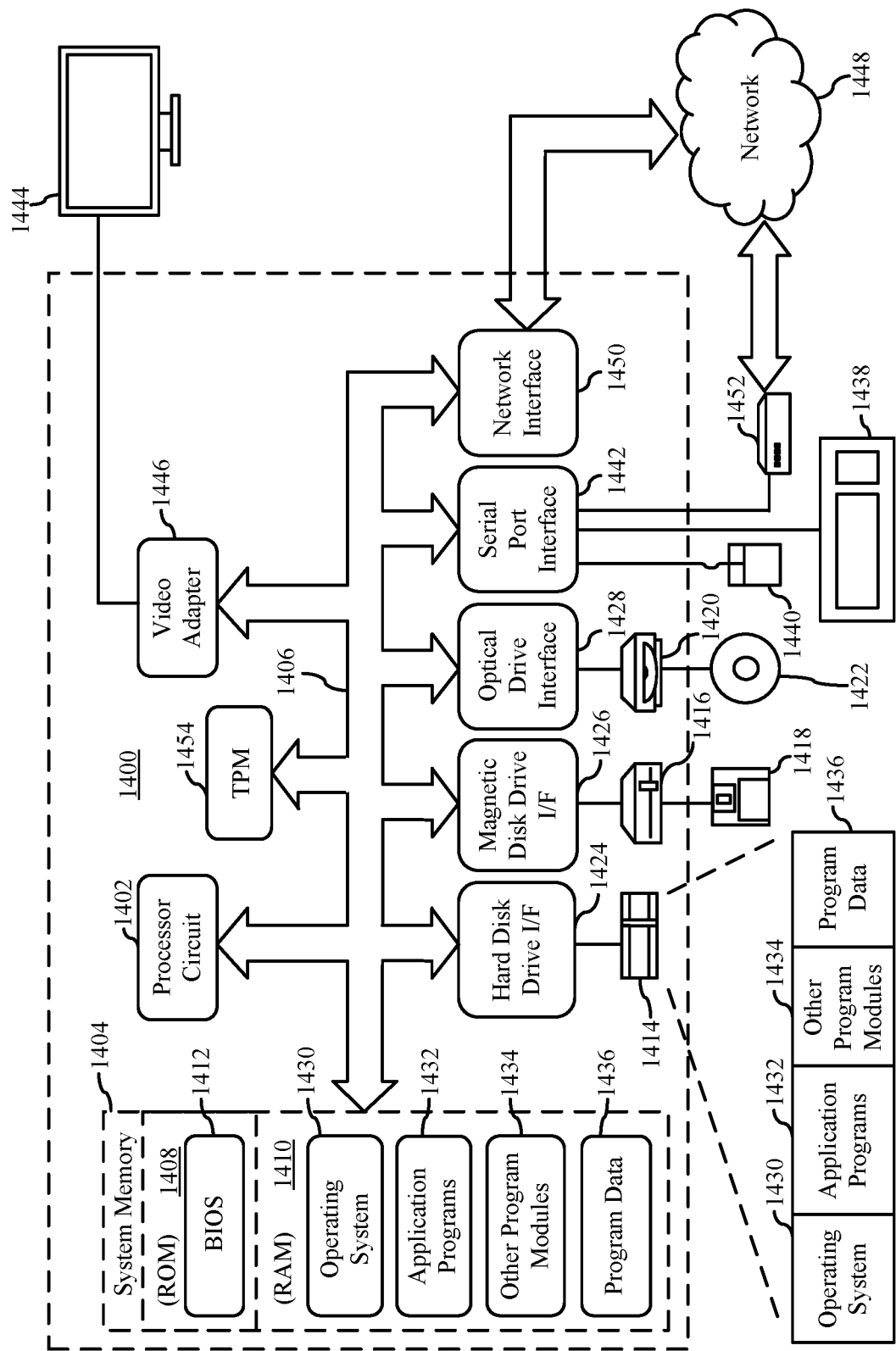
FIG. 14 is a block diagram of an example processor-based computer system that may be used to implement various embodiments.

FIG. 14 depicts an exemplary implementation of a computing device 1400 in which embodiments may be implemented. For example, embodiments described herein may be implemented in one or more computing devices similar to computing device 1400 in stationary or mobile computer embodiments, including one or more features of computing device 1400 and/or alternative features. The description of computing device 1400 provided herein is provided for purposes of illustration, and is not intended to be limiting. Embodiments may be implemented in further types of computer systems and/or game consoles, etc., as would be known to persons skilled in the relevant art(s).

As shown in FIG. 14, computing device 1400 includes one or more processors, referred to as processor circuit 1402, a system memory 1404, and a bus 1406 that couples various system components including system memory 1404 to processor circuit 1402. Processor circuit 1402 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1402 may execute program code stored in a computer readable medium, such as program code of operating system 1430, application programs 1432, other programs 1434, etc. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

Computing device 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, or other optical media. Hard disk drive 1414, magnetic disk drive 1416, and optical disk drive 1420 are connected to bus 1406 by a hard disk drive interface 1424, a magnetic disk drive interface 1426, and an optical drive interface 1428, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include incoming network proxy 104, web application 108, outgoing network proxy 110, identity endpoint 106, web API 112, browser application 114, incoming network proxy 204, web application 208, outgoing network proxy 210, identity endpoint 206, web API 212, browser application 214, secure environment 1204, along with any components and/or subcomponents thereof, as well as the flowcharts/flow diagrams described herein (e.g., flowchart 600, flowchart 700, flowchart 800, flowchart 1000, and/or flowchart 1100), including portions thereof, and/or further examples described herein.

A user may enter commands and information into the computing device 1400 through input devices such as keyboard 1438 and pointing device 1440. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1402 through a serial port interface 1442 that is coupled to bus 1406, but may be connected by other interfaces, such as a parallel port, game port, or a universal serial bus (USB).

A display screen 1444 is also connected to bus 1406 via an interface, such as a video adapter 1446. Display screen 1444 may be external to, or incorporated in computing device 1400. Display screen 1444 may display information, as well as being a user interface for receiving user commands and/or other information (e.g., by touch, finger gestures, virtual keyboard, etc.). In addition to display screen 1444, computing device 1400 may include other peripheral output devices (not shown) such as speakers and printers.

Computing device 1400 is connected to a network 1448 (e.g., the Internet) through an adaptor or network interface 1450, a modem 1452, or other means for establishing communications over the network. Modem 1452, which may be internal or external, may be connected to bus 1406 via serial port interface 1442, as shown in FIG. 14, or may be connected to bus 1406 using another interface type, including a parallel interface.

TPM 1454 may be connected to bus 1406, and may be an embodiment of secure environment 1204 of FIG. 12, as described herein.

As used herein, the terms "computer program medium," "computer-readable medium," and "computer-readable storage medium," etc., are used to refer to physical hardware media. Examples of such physical hardware media include the hard disk associated with hard disk drive 1414, removable magnetic disk 1418, removable optical disk 1422, other physical hardware media such as RAMs, ROMs, flash memory cards, digital video disks, zip disks, MEMs, nano-technology-based storage devices, and further types of physical/tangible hardware storage media (including memory 1420 of FIG. 14). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1432 and other programs 1434) may be stored on the hard disk, magnetic disk, optical disk, ROM, RAM, or other hardware storage medium. Such computer programs may also be received via network interface 1450, serial port interface 1442, or any other interface type. Such computer programs, when executed or loaded by an application, enable computing device 1400 to implement features of embodiments discussed herein. Accordingly, such computer programs represent controllers of the computing device 1400.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Exemplary Embodiments

A system is described herein. The system includes: at least one processor circuit; at least one memory that stores program code configured to be executed by the at least one processor circuit, the program code comprising: a first network proxy configured to: receive an anonymous application programming interface (API) call from a web application; obtain a first access token associated with a user of the web application; generate a first request for data based on the anonymous API call, the first request including the first access token; and send the first request to an API configured to return the requested data to the web application.

In an embodiment of the system, the first network proxy is further configured to: receive, from the API, a claims challenge response indicating that the first access token is invalid; obtain a second access token associated with the user; generate a second request for the data based on the anonymous API call, the second request including the second access token; and send the second request to the API.

In an embodiment of the system, the claims challenge response comprises a uniform resource identifier of an identity endpoint configured to authenticate the user, and wherein the first network proxy is further configured to: send, to a second network proxy, a claims request that comprises the uniform resource identifier, the claims request being configured to cause the second network proxy to redirect a browser application utilized by the user to the identity endpoint; and receive, from the second network proxy, a response that comprises the second access token, the second network proxy being configured to receive the second access token from the identity endpoint responsive to the user being successfully authenticated by the identity endpoint.

In an embodiment of the system, the first network proxy is further configured to: determine that a refresh token associated with the first access token is valid; send a third request to an identity endpoint configured to authenticate the user, the third request comprising the refresh token; and receive, from the identity endpoint, a response that comprises the second access token.

In an embodiment of the system, the first network proxy is further configured to: receive, from a second network proxy, a plurality of access tokens, each associated with a respective user; and store the plurality of access tokens in a data structure that maps each of the plurality of access tokens to the respective user to which the access token is associated.

In an embodiment of the system, the first network proxy is further configured to: retrieve the first access token from the data structure based on an identifier of the user; and store the first access token into the header of the first request.

In an embodiment of the system, the first network proxy is further configured to: receive, from the API, a response indicating that the web application does not have permission to access the data; obtain a second access token associated with the user that authorizes the web application to access the data; generate a second request for the data based on the anonymous API call, the second request including the second access token; and send the second request to the API.

In an embodiment of the system, the first network proxy is further configured to: sending, to a second network proxy, a third request that specifies a permission for which consent from the user is required, the third request being configured to cause the second network proxy to redirect a browser application utilized by the user to an identity endpoint configured to prompt the user for consent for the permission; and receiving, from the second network proxy, a response that comprises a second access token, the second network proxy being configured to receive the second access token from the identity endpoint responsive to the user providing consent for the permission.

A method is also described herein. The method comprises: receiving an anonymous application programming interface (API) call from a web application; obtaining a first access token associated with a user of the web application; generating a first request for data based on the anonymous API call, the first request including the first access token; and sending the first request to an API configured to return the requested data to the web application.

In an embodiment of the method, the method further comprises: receiving, from the API, a claims challenge response indicating that the first access token is invalid; obtaining a second access token associated with the user; generating a second request for the data based on the anonymous API call, the second request including the second access token; and sending the second request to the API.

In an embodiment of the method, the claims challenge response comprises a uniform resource identifier of an identity endpoint configured to authenticate the user, and said obtaining the second access token comprises: sending, to a second network proxy, a claims request that comprises the uniform resource identifier, the claims request being configured to cause the second network proxy to redirect a browser application utilized by the user to the identity endpoint; and receiving, from the second network proxy, a response that comprises the second access token, the second network proxy being configured to receive the second access token from the identity endpoint responsive to the user being successfully authenticated by the identity endpoint.

In an embodiment of the method, said obtaining comprises: determining that a refresh token associated with the first access token is valid; in response to said determining, sending a third request to an identity endpoint configured to authenticate the user, the third request comprising the refresh token; and receiving, from the identity endpoint, a response that comprises the second access token.

In an embodiment of the method, the method further comprises: receiving, from a second network proxy, a plurality of access tokens, each associated with a respective user; and storing the plurality of access tokens in a data structure that maps each of the plurality of access tokens to the respective user to which the access token is associated.

In an embodiment of the method, said obtaining comprises retrieving the first access token from the data structure based on an identifier of the user; and said generating comprises storing the first access token into the header of the first request.

In an embodiment of the method, the method further comprises: storing the first access token in a digital envelope signed by a secure environment associated with the first network proxy and the web application, wherein the request includes the signed envelope.

In an embodiment of the method, the first network proxy and the web application execute on a computing device, and wherein the first access token is bound to the computing device.

In an embodiment of the method, the method further comprises: receiving, from the API, a response indicating that the web application does not have permission to access the data; obtaining a second access token associated with the user that authorizes the web application to access the data; generating a second request for the data based on the anonymous API call, the second request including the second access token; and sending the second request to the API.

In an embodiment of the method, said obtaining comprises: sending, to a second network proxy, a third request that specifies a permission for which consent from the user is required, the third request being configured to cause the second network proxy to redirect a browser application utilized by the user to an identity endpoint configured to prompt the user for consent for the permission; and receiving, from the second network proxy, a response that comprises a second access token, the second network proxy being configured to receive the second access token from the identity endpoint responsive to the user providing consent for the permission.

A computer-readable storage medium having program instructions recorded thereon that, when executed by a processor of a computing device, perform a method is also described herein. The method comprises: receiving an anonymous application programming interface (API) call from a web application; obtaining a first access token associated with a user of the web application; generating a first request for data based on the anonymous API call, the first request including the first access token; and sending the first request to an API configured to return the requested data to the web application.

In an embodiment of the computer-readable storage medium, the method further comprises: receiving, from the API, a claims challenge response indicating that the first access token is invalid; obtaining a second access token associated with the user; generating a second request for the data based on the anonymous API call, the second request including the second access token; and sending the second request to the API.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system, comprising:
    a processor circuit;
    a memory that stores first program code executable by the processor circuit, the first program code comprising:
        a network proxy communicatively coupled with an application programming interface (API) and intermediate to a web application and a browser application, wherein the network proxy is configured to:
            receive a first request from the browser application associated with a user;
            responsive to the reception of the first request, send a second request to an identity endpoint to authenticate the user;
            responsive to the identity endpoint authenticating the user, receive a first access token;
            receive an anonymous API call from the web application;
            generate a third request based on the anonymous API call, the third request specifying data being requested and including the first access token; and
            send the third request to the API.

2. The system of claim 1, wherein the network proxy is further configured to store the first access token in a digital envelope signed by a secure environment associated with the network proxy, wherein the third request includes the signed envelope.

3. The system of claim 1, wherein the memory comprises second program code executable by the processor circuit, the second program code comprising the web application; and
    wherein the first access token is bound to the system.

4. The system of claim 1, wherein the network proxy is further configured to:
    receive, from the API, a response indicating that the web application does not have permission to access the data;
    cause a prompt to the user for consent for the permission;
    responsive to the user providing consent for the permission, obtain a second access token associated with the user that authorizes the web application to access the data; and
    send, to the API, a fourth request based on the anonymous API call, the fourth request specifying the data being requested and including the second access token.

5. The system of claim 4, wherein to cause the prompt to the user for consent for the permission the network proxy is configured to:

cause the browser application to redirect to the identity endpoint, the identity endpoint configured to prompt the user for consent for the permission; and to obtain the second access token the network proxy is configured to, responsive to the user providing consent for the permission, receive the second access token from the identity endpoint.

6. The system of claim 1, wherein the network proxy is further configured to:

responsive to an indication that the first access token is invalid, determine a refresh token associated with the first access token is valid;

send a fourth request to the identity endpoint, the fourth request comprising the refresh token;

receive, from the identity endpoint, a response that comprises a second access token associated with the user; and send, to the API, a fourth request based on the anonymous API call, the fourth request including the second access token.

7. The system of claim 6, wherein the network proxy is further configured to receive, from the API, a claims challenge response indicating that the first access token is invalid; and wherein the network proxy is configured to determine the refresh token is valid in response to the reception of the claims challenge response.

8. The system of claim 7, wherein the claims challenge response includes a uniform resource identifier of the identity endpoint; and the network proxy is configured to send the fourth request to the identity endpoint based on the included uniform resource identifier.

9. A method performed by a network proxy application executing on a computing device, the network proxy communicatively coupled with an application programming interface (API) and intermediate to a web application and a browser application, the method comprising:

receiving a first request from the browser application associated with a user;

responsive to receiving the first request, sending a second request to an identity endpoint to authenticate the user;

responsive to the identity endpoint authenticating the user, receiving a first access token;

receiving an anonymous API call from the web application;

generating a third request based on the anonymous API call, the third request specifying data being requested and including the first access token; and sending the third request to the API.

10. The method of claim 9, further comprising:

storing the first access token in a digital envelope signed by a secure environment associated with the network proxy, wherein the third request includes the signed envelope.

11. The method of claim 9, wherein the web application executes on the computing device, and the first access token is bound to the computing device.

12. The method of claim 9, further comprising:

receiving, from the API, a response indicating that the web application does not have permission to access the data;

causing a prompt to the user for consent for the permission;

responsive to the user providing consent for the permission, obtaining a second access token associated with the user that authorizes the web application to access the data; and sending, to the API, a fourth request based on the anonymous API call, the fourth request specifying the data being requested and including the second access token.

13. The method of claim 12, wherein said causing the prompt to the user for consent for the permission comprises:

causing the browser application to redirect to the identity endpoint, the identity endpoint configured to prompt the user for consent for the permission; and wherein said obtaining the second access token comprises, responsive to the user providing consent for the permission, receiving the second access token from the identity endpoint.

14. The method of claim 9, further comprising:

responsive to an indication that the first access token is invalid, determining a refresh token associated with the first access token is valid;

sending a fourth request to the identity endpoint, the fourth request comprising the refresh token;

receiving, from the identity endpoint, a response that comprises a second access token associated with the user; and sending, to the API, a fourth request based on the anonymous API call, the fourth request including the second access token.

15. The method of claim 14, further comprising:

receiving, from the API, a claims challenge response indicating that the first access token is invalid; and determining the refresh token is valid in response to the reception of the claims challenge response.

16. The method of claim 15, wherein the claims challenge response includes a uniform resource identifier of the identity endpoint.

17. A computer-readable storage medium having program instructions recorded thereon that, when executed by a processor of a computing device, perform a method implemented by a network proxy communicatively coupled with an application programming interface (API) and intermediate to a web application and a browser application, the method comprising:

receiving a first request from the browser application associated with a user;

responsive to receiving the first request, sending a second request to an identity endpoint to authenticate the user;

responsive to the identity endpoint authenticating the user, receiving a first access token;

receiving an anonymous application programming interface (API) call from the web application;

generating a third request based on the anonymous API call, the third request specifying data being requested and including the first access token; and sending the third request to the API.

18. The computer-readable storage medium of claim 17, wherein the method further comprises:

storing the first access token in a digital envelope signed by a secure environment associated with the network proxy, wherein the third request includes the signed envelope.

19. The computer-readable storage medium of claim 17, wherein the web application executes on the computing device, and the first access token is bound to the computing device.

20. The computer-readable storage medium of claim 17, wherein the method further comprises:

receiving, from the API, a response indicating that the web application does not have permission to access the data;

causing a prompt to the user for consent for the permission;

responsive to the user providing consent for the permission, obtaining a second access token associated with the user that authorizes the web application to access the data; and sending, to the API, a fourth request based on the anonymous API call, the fourth request specifying the data being requested and including the second access token.

* * * * *